(12) United States Patent
Xiong et al.

(10) Patent No.: US 11,979,236 B2
(45) Date of Patent: May 7, 2024

(54) PHYSICAL UPLINK CONTROL CHANNEL RESOURCE DETERMINATION AND MULTIPLEXING OF MULTIPLE HYBRID AUTOMATIC REPEAT REQUEST ACKNOWLEDGEMENT FEEDBACKS AND OTHER UPLINK CONTROL INFORMATION ON PHYSICAL UPLINK CONTROL CHANNEL AND PHYSICAL UPLINK SHARED CHANNEL

(71) Applicant: INTEL CORPORATION, Santa Clara, CA (US)

(72) Inventors: Gang Xiong, Portland, OR (US); Debdeep Chatterjee, San Jose, CA (US); Fatemeh Hamidi-Sepehr, Santa Clara, CA (US); Toufiqul Islam, Sunnyvale, CA (US); Sergey Panteleev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 415 days.

(21) Appl. No.: 17/270,576

(22) PCT Filed: Sep. 27, 2019

(86) PCT No.: PCT/US2019/053695
§ 371 (c)(1),
(2) Date: Feb. 23, 2021

(87) PCT Pub. No.: WO2020/069468
PCT Pub. Date: Apr. 2, 2020

(65) Prior Publication Data
US 2021/0211241 A1   Jul. 8, 2021

Related U.S. Application Data

(60) Provisional application No. 62/739,081, filed on Sep. 28, 2018.

(51) Int. Cl.
*H04L 1/1812* (2023.01)
*H04L 1/1867* (2023.01)
(Continued)

(52) U.S. Cl.
CPC .......... *H04L 1/1819* (2013.01); *H04L 1/1896* (2013.01); *H04W 72/0446* (2013.01); *H04W 72/21* (2023.01); *H04W 72/23* (2023.01)

(58) Field of Classification Search
CPC ... H04L 1/1819; H04L 1/1896; H04L 1/1671; H04L 1/1854; H04L 5/0044;
(Continued)

(56) References Cited

U.S. PATENT DOCUMENTS

2017/0318575 A1* 11/2017 Park .................. H04L 1/1664
2018/0324768 A1* 11/2018 Shaheen ............... H04L 5/0053
(Continued)

FOREIGN PATENT DOCUMENTS

WO    2014165690 A1    9/2014
WO    2018/021821 A1    2/2018
(Continued)

OTHER PUBLICATIONS

NTT DOCOMO, Inc, Physical Layer Enhancements for NR URLLC, 3GPP TSG RAN WG1 Meeting #94, Gothenburg, Sweden, Aug. 20-24, 2018, R1-1809163 (Year: 2018).*
(Continued)

*Primary Examiner* — Shailendra Kumar
(74) *Attorney, Agent, or Firm* — Eschweiler & Potashnik, LLC

(57) ABSTRACT

A device of a New Radio (NR) User Equipment (UE), a method and a machine readable medium to implement the method. The device includes a Radio Frequency (RF) interface, and processing circuitry coupled to the RF interface, the processing circuitry to: determine that the UE is config-
(Continued)

ured with a feature of multiple Physical Uplink Control Channel (PUCCH) resources with HARQ-ACK feedback within a slot; determine a Physical Uplink Control Channel (PUCCH) resource to carry Hybrid Automatic Repeat Request Acknowledgment (HARQ-ACK) feedback in response to a scheduled Physical Downlink Shared Channel (PDSCH) resource; and encode for transmission to a NR evolved NodeB (gNodeB) the PUCCH resource, the PUCCH resource to carry the HARQ-ACK feedback and: another PUCCH resource carrying Uplink Control Information (UCI) other than HARQ-ACK feedback, and a scheduled Physical Uplink Shared Channel (PUSCH) resource.

20 Claims, 7 Drawing Sheets

(51) Int. Cl.
*H04W 72/0446* (2023.01)
*H04W 72/21* (2023.01)
*H04W 72/23* (2023.01)

(58) Field of Classification Search
CPC ............ H04L 5/0055; H04W 72/0446; H04W 72/21; H04W 72/23
See application file for complete search history.

(56) References Cited

U.S. PATENT DOCUMENTS

| | | | | |
|---|---|---|---|---|
| 2019/0141696 | A1* | 5/2019 | Kim | H04L 5/0055 |
| 2020/0106569 | A1* | 4/2020 | Tsai | H04W 72/23 |
| 2020/0228250 | A1* | 7/2020 | Cheng | H04L 1/1835 |
| 2021/0281458 | A1* | 9/2021 | Takeda | H04L 1/1854 |

FOREIGN PATENT DOCUMENTS

| | | | | |
|---|---|---|---|---|
| WO | 2018112322 | A2 | 6/2018 | |
| WO | WO-2018142264 | A1 * | 8/2018 | ........... H04L 5/0055 |
| WO | 2018085044 | A1 | 11/2018 | |

OTHER PUBLICATIONS

Huawei, HiSilicon, HARQ enhancements in NR unlicensed, 3GPP TSG RAN WG1 Meeting #94, Gothenburg, Sweden, Aug. 20-Aug. 24, 2018, R1-1808063. (Year: 2018).*
Ericsson, Maintenance issues of physical uplink control channel, 3GPP TSG-RAN WG1 Meeting #94, Gothenburg, Sweden, Aug. 20-24, 2018, R1-1809406 (Year: 2018).*
International Search Report dated Jan. 15, 2020 for International Application No. PCT/US2019/053695.
"Maintenance issues of physical uplink control channel." Source: Ericsson. Agenda Item: 7.1.3.2. 3GPP TSG-RAN WG1 Meeting #94, Gothenburg, Sweden, Aug. 20-24, 2018. R1809406.
"HARQ enhancements in NR unlicensed." Source: Huawei, HiSilicon. Agenda Item: 7.2.2.4.3. 3GPP TSG RAN WG1 Meeting #94, Gothenburg, Sweden, Aug. 20-Aug. 24, 2018. R1-1808063.
"Physical Layer Enhancements for NR URLLC." Source: NTT DOCOMO, Inc. Agenda Item: 7.2.6.1. 3GPP TSG RAN WG1 Meeting #94. Gothenburg, Sweden, Aug. 20-24, 2018. R1-1809163.
Remaining issues on DL/UL Scheduling, Processing Time and HARQ. Source: Qualcomm Incorporated. Agenda Item: 7.1.3.3.2. 3GPP TSG-RAN WG1 Meeting #92, Feb. 26-Mar. 2, 2018. Athens, Greece. R1-1802842.
Supplementary European Search Report dated May 17, 2022 in connection with Application Serial No. 19866332.0.
5G; NR; Physical layer procedures for control; (3GPP TS 38.213 version 15.2.0 Release 15); ETSI TS 138 213 V15.2.0 ; Jul. 2018.
5G; NR; Physical layer procedures for data; (3GPP TS 38.214 version 15.2.0 Release 15); ETSI TS 138 214 V15.2.0; Jul. 2018.
Samsung; "Resource Allocation for PUCCH with HARQ-ACK"; 3GPP TSG RAN WG1 Meeting #89; R1-1708009; May 15, 2017.

* cited by examiner

PHYSICAL UPLINK CONTROL CHANNEL RESOURCE DETERMINATION AND MULTIPLEXING OF MULTIPLE HYBRID AUTOMATIC REPEAT REQUEST ACKNOWLEDGEMENT FEEDBACKS AND OTHER UPLINK CONTROL INFORMATION ON PHYSICAL UPLINK CONTROL CHANNEL AND PHYSICAL UPLINK SHARED CHANNEL

CROSS REFERENCE TO RELATED APPLICATIONS

This application is a National Phase entry application of International Patent Application No. PCT/US2019/053695 filed Sep. 27, 2019, which claims priority to U.S. Provisional Patent Application 62/739,081 entitled "FEEDBACKS AND OTHER UCI ON PUCCH AND PUSCH," filed Sep. 28, 2018, and is hereby incorporated by reference in its entirety.

FIELD

Various embodiments generally may relate to the field of wireless communications, and particularly to the field of Hybrid Automatic Repeat Request Acknowledgment scheduling using uplink resources in a cellular network environment.

BACKGROUND

Current Third Generation Partnership Project (3GPP) New Radio (NR) specifications do not specifically address issues related to the manner of multiplexing uplink resources, such as UCI carrying HARQ-ACK feedback.

DETAILED DESCRIPTION

Figure 1:
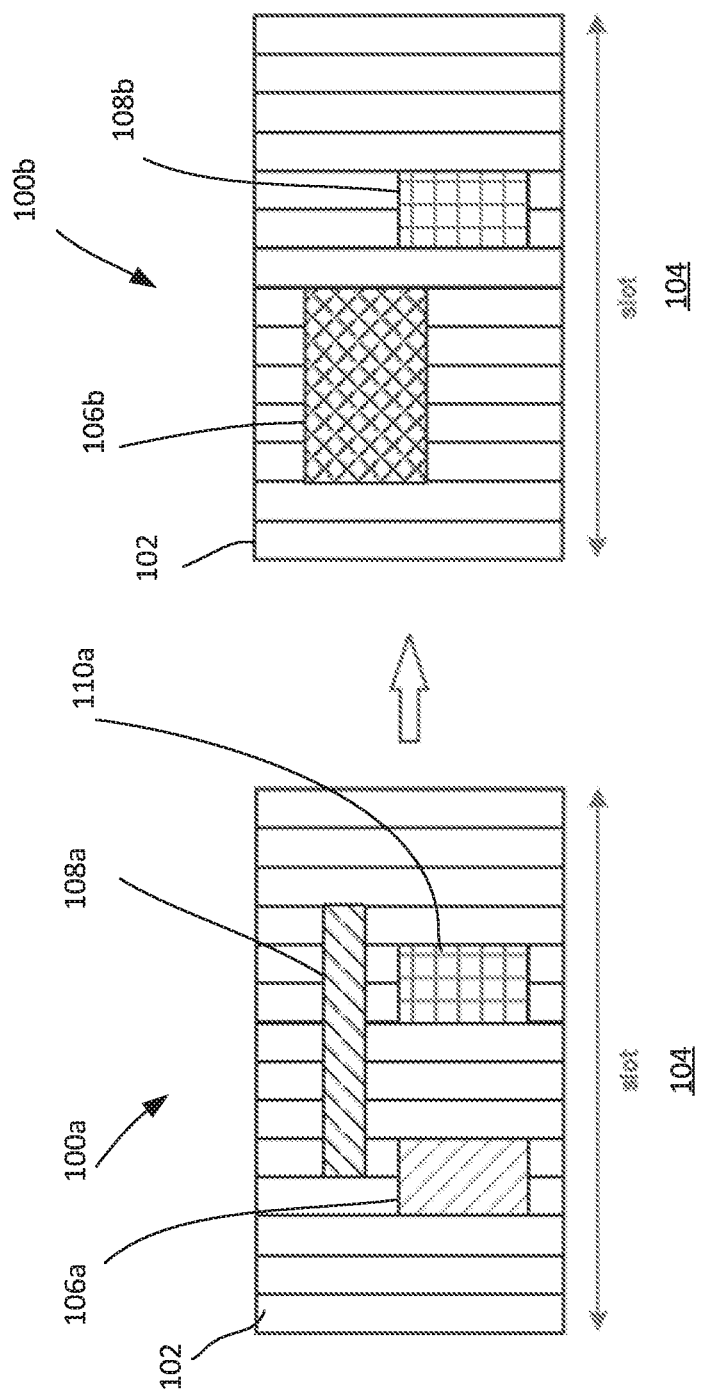
FIG. 1 illustrates time frequency resources showing a multiplexing of HARQ-ACK feedback with another Uplink Control Information (UCI) in a Physical Uplink Control Channel (PUCCH) resource in a single slot according to a first embodiment.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Mobile communication has evolved significantly from early voice systems to today's highly sophisticated integrated communication platforms. The next generation wireless communication system, 5G, or new radio (NR), will provide access to information and sharing of data anywhere, anytime by various users and applications.

As defined in NR, short physical uplink control channel (PUCCH) (PUCCH formats 0 and 2) can span 1 or 2 symbols and long PUCCH (PUCCH formats 1, 3 and 4) can span from 4 to 14 symbols within a slot. Further, long PUCCH may span multiple slots to further enhance coverage. In addition, for a given User Equipment (UE), two short PUCCHs as well as short PUCCH and long PUCCH can be multiplexed in a time division multiplexing (TDM) manner in the same slot.

In NR, uplink control information (UCI) can be carried by PUCCH or PUSCH. In particular, UCI may include scheduling request (SR), hybrid automatic repeat request-acknowledgement (HARQ-ACK) feedback, channel state information (CSI) report, e.g., channel quality indicator (CQI), pre-coding matrix indicator (PMI), CSI resource indicator (CRI) and rank indicator (RI) and/or beam related information (e.g., L1-RSRP (layer 1-reference signal received power)).

In NR Release 15 (Rel-15), it was agreed that for semi-static and dynamic hybrid automatic repeat request-acknowledgement (HARQ-ACK) codebook, only one HARQ-ACK feedback is to be transmitted in one slot. Further, this HARQ-ACK feedback can be carried by either physical uplink control channel (PUCCH) or physical uplink shared channel (PUSCH). Further, for semi-static and dynamic HARQ-ACK codebook in a single component carrier (CC) scenario, PUCCH resource allocation is determined in accordance with the last downlink control information (DCI) scheduling the physical downlink shared channel (PDSCH). In particular, a PUCCH resource indicator in the last DCI and/or a starting control channel element (CCE) index for the physical downlink control channel (PDCCH) carrying the last DCI are jointly employed to determine the PUCCH resource carrying HARQ-ACK feedback.

As mentioned above, only one HARQ-ACK feedback or PUCCH/PUSCH transmission carrying HARQ-ACK feedback is allowed in a slot in the NR Rel-15 specification. In the event that the PUCCH carrying HARQ-ACK feedback is scheduled in the last part of the slot, a HARQ-ACK feedback delay can be expected, especially when considering the smaller subcarrier spacing, e.g., 15 kHz including a 1 ms slot duration. To support Ultra Reliable Low Latency Communication (URLLC) types of applications, it is envisioned according to embodiments that an additional PUCCH resource carrying HARQ-ACK feedback in a slot may be needed. For instance, the additional PUCCH resource carrying HARQ-ACK feedback may be transmitted in the earlier part of the slot so as to reduce latency.

Where plurality of PUCCH resources carrying HARQ-ACK feedback are envisioned to be scheduled in a slot, however, the plurality of PUCCH resources may overlap with another PUCCH resource carrying a same or different UCI types or carrying PUSCH. In such a case, certain mechanisms are needed for UCI multiplexing to ensure alignment between a NR evolved NodeB (gNodeB) and a UE.

Embodiments pertain to devices, methods, systems and products to allow multiplexing of multiple HARQ-ACK feedbacks and other UCI on PUCCH and PUSCH in a same slot. In particular, embodiments envision multiplexing multiple HARQ-ACK feedbacks and other UCI on PUCCH, and multiplexing multiple HARQ-ACK feedbacks and PUSCH Multiplexing Multiple HARQ-ACK Feedbacks and Other UCI on PUCCH As mentioned above, in case a plurality of PUCCH resources carrying HARQ-ACK feedback are scheduled in a slot, and the plurality of PUCCH resources overlap with another PUCCH carrying a same or different UCI types or PUSCH, certain mechanisms need to be defined for UCI multiplexing.

In the following description, dynamic HARQ-ACK feedback corresponds to the case where the HARQ-ACK is in response to a physical downlink shared channel (PDSCH) reception scheduled by a corresponding physical downlink control channel (PDCCH). In addition, semi-persistent scheduled (SPS) HARQ-ACK feedback corresponds to the case where the HARQ-ACK is in response to a PDSCH reception without an associated PDCCH.

Embodiments of multiplexing multiple HARQ-ACK feedback and other UCI on PUCCH in a slot are described below.

According to one embodiment, when a plurality of PUCCH resources carrying dynamic HARQ-ACK feedback in a first UCI overlap with another PUCCH resource carrying a second UCI, wherein HARQ-ACK feedback and the second UCI are not distinguished in terms of the corresponding service types or priorities, and if a timeline requirement is satisfied, the UCI multiplexing follows the procedure as defined in Section 9.2.5 in TS38.213 V15.2.0.

The second UCI may include a periodic and/or semi-persistent scheduled CSI (P/SP-CSI) report and/or SR and/or SPS HARQ-ACK feedback. Further, it is assumed here that the UE is configured to multiplex HARQ-ACK and CSI in a PUCCH resource via higher layers. Otherwise, the UE is expected to transmit the PUCCH transmissions with the HARQ-ACK feedback and to drop the P/SP-CSI reports.

More specifically, according to some embodiments, in a first step, the UE may determine a set of overlapping PUCCH resources for UCI multiplexing. In NR Rel-15, for PUCCH resource allocation, the resource set is first determined based on the UCI payload size. Within a resource set, one resource from multiple configured resources are indicated to UE, based on the PUCCH resource indicator field in DCI. Each PUCCH resource is identified by PUCCH format, starting symbol, starting RB (frequency-domain allocation), cyclic shifts, and code domain allocation (e.g., if there is an OCC, etc., depending on the particular format). This information can therefore be indicated to the UE.

When the second UCI and the first HARQ-ACK PUCCH resource are considered for UCI multiplexing, if the resulting determined first PUCCH resource carrying the second UCI and the first HARQ-ACK feedback do not overlap with the second HARQ-ACK PUCCH resource, and if one of the PUCCH resources is a short PUCCH, the UE may transmit two PUCCHs in a slot. Alternatively, the second UCI and the second HARQ-ACK payload may be considered for UCI multiplexing, and if the resulting determined second PUCCH resource carrying the second UCI and the second HARQ-ACK feedback payload do not overlap with the first HARQ-ACK PUCCH resource, and if one of the PUCCH resources is a short PUCCH, then the UE may transmit the first HARQ-ACK PUCCH and the determined second PUCCH resource within the slot.

As a generalization of the above, the UE may evaluate either option of multiplexing the second UCI with the first or the second HARQ-ACK PUCCH resource, and may transmit the combination of multiple PUCCH transmissions within the slot depending on the resulting determined first PUCCH resource (to carry the first HARQ-ACK feedback and the second UCI) or the second PUCCH resource (to carry the second HARQ-ACK and the second UCI). In case both options are feasible, the UE may transmit following either the (i) updated/determined first PUCCH resource and second HARQ-ACK PUCCH, or the (ii) updated/determined second PUCCH resource and first HARQ-ACK PUCCH. The first or second PUCCH resources are "updated" as used herein in the sense that they are used to multiplex the first or second HARQ-ACK feedback with the second UCI, respectively.

FIG. 1 illustrates one example of multiplexing two HARQ-ACKs and a second UCI (such as one carrying P/SP-CSI reports) on PUCCH in a slot 104 with symbols 102. In particular, FIG. 1 shows respective time frequency resources 100a and 100b, where resource 100a shows determined uplink resources prior to multiplexing of a first or second HARQ-ACK feedback with the second UCI, and resource 100B shows uplink resources updated after multiplexing of the first HARQ-ACK feedback with the second UCI according to one embodiment (updated uplink resources). In particular, in the example, as shown in FIG. 1 at 100a, two PUCCH resources 106a and 110a to carry separate first and second HARQ-ACK feedbacks, respectively, are determined by the UE to overlap with another PUCCH resource 108a that is to carry P/SP CSI report. According to the UCI multiplexing procedure of one embodiment, uplink resources may be updated by the UE in the form of PUCCH resource 106b to carry the second UCI of PUCCH resource 108a along with the first HARQ-ACK feedback of PUCCH resource 106a. Given that the determined first PUCCH resource 106a does not overlap with the second determined HARQ-ACK PUCCH resource 110a in FIG. 1, the UE may therefore, according to this embodiment, transmit both updated PUCCH resources 106b and 108b in a same slot 104 as shown in FIG. 1.

By allowing multiple HARQ-ACKs to be transmitted within a slot, a PUCCH resource indicator in the DC's scheduling the PDSCHs where the corresponding HARQ-ACK feedbacks are scheduled in the same slot, may, according to an embodiment, point to different starting symbols for PUCCH resources, or to different PUCCH resources with no time domain overlap. The actual PUCCH resources which carry such feedbacks (as well as other potentially multiplexed reports), may then be determined directly based on the corresponding PUCCH resource indicator values. This is applicable both for the case where HARQ-ACK feedbacks do not overlap with each other or any other report/information, as well as when any HARQ-ACK feedback overlaps (and is multiplexed) with any other reports/information, while the resulting determined PUCCH resource does not overlap with other HARQ-ACK feedbacks (or HARQ-ACK feedbacks multiplexed with some other reports/information).

With the PUCCH resource indicator values being read and used from the corresponding DCIs, some reference point may be defined to further adjust the PUCCH resource, such as, for example, its starting symbol. In one example, the PUCCH resource indicator may be interpreted relative to the beginning of the slot. In another example, the PUCCH resource indicator may be interpreted relative to the end/start of the last PUCCH resource carrying a HARQ-ACK.

Alternatively, some relative symbol offset may be defined and dynamically or semi-statically indicated by RRC configuration signaling or L1-signaling, such that in case of multiple HARQ-ACK transmissions within a slot, the timing relationship between the corresponding PUCCH resources carrying the HARQ-ACK feedbacks (potentially each multiplexed with any other report/information), are implicitly or explicitly indicated to the UE.

According to one embodiment, the indication of different PUCCH resources for HARQ-ACK feedback within a slot may be achieved via a combination of a K1 offset (as indicated by a PDSCH-to-HARQ-timing-indicator field in the scheduling DCI format, if present, or as provided by higher layer parameter dl-DataToUL-ACK) and the PUCCH resource indicator (PRI) in the scheduling DCI. Specifically, the starting symbol of a PUCCH resource indicated by the PRI may be interpreted jointly with the indicated value of the PDSCH-to-HARQ-timing-indicator field K1 in the DCI (or as provided by the higher layer parameter dl-DataToUL-ACK), wherein the latter indication may be reinterpreted to indicate the PDSCH-end to the HARQ-ACK-start timing offset using a combination of one or more of: slots, half-slots, or a set of one or more symbols (as against the Rel-15 interpretation in terms of number of slots).

According to an embodiment, the UE may be configured by higher layers (such as by UE-specific RRC signaling) with the possibility of multiple PUCCH transmissions with HARQ-ACK feedback in a slot, or alternatively, configured by higher layers to follow a different interpretation of the K1 offset and PUCCH resource starting symbol determination for HARQ-ACK feedback while being capable of transmitting multiple PUCCH transmissions with HARQ-ACK feedback in a slot.

Following the above, the value indicated using PDSCH-to-HARQ-timing-indicator field in the DCI format (and/or the higher layer parameter dl-DataToUL-ACK) may be interpreted in units of half-slots or in units of a specified number of one or more symbols, e.g., 2, 4 or 7 symbols. Subsequently, the startingSymbolIndex parameter is interpreted with respect to the half-slot boundary as against the slot boundary with the value of the starting PUCCH symbol translated as startingSymbolIndex'=(startingSymbolIndex−7) (and as startingSymbolIndex'=(startingSymbolIndex−6) for ECP case).

According to some other embodiments, let us assume that the PDSCH-to-HARQ-timing-indicator field in the DCI format is either N=2 or 3 bits long. In such a case, the PDSCH-to-HARQ-timing-indicator field in the DCI format may be interpreted such that the last (N−1) least significant bit(s) (LSBs) of the DCI bit-field indicate one of 2 (N−1) values in units of slots as configured in the first 2 (N−1) values provided by higher layer parameter dl-DataToUL-ACK, and the most significant bit (MSB) (1 bit) of the PDSCH-to-HARQ-timing-indicator field in the DCI format is used to indicate an additional half-slot offset or a symbol group, where the number of symbols within the symbol group can be predefined in the specification or configured by higher layers. Thus, for the half-slot offset indication, a '0' may indicate that the timing offset is in terms of an integer number of slots from PDSCH-end, while a '1' indicates that the timing offset is in terms of an integer number of slots from the PDSCH-end plus another half-slot (7 symbols for normal cyclic prefix (NCP) length and 6 symbols for extended cyclic prefix (ECP) length where the cyclic prefix (CP) configuration corresponds to that for the PUCCH in the corresponding UL bandwidth part (BWP)). Further, when an additional half-slot offset is indicated, then the UE interprets the starting symbol for the indicated PUCCH resource with respect to symbol index 7 (for NCP) or symbol index 6 (for ECP) of the corresponding slot. Accordingly, the parameter startingSymbolIndex of the PUCCH resource is translated as startingSymbolIndex'=(startingSymbolIndex−7) (and as startingSymbolIndex'=(startingSymbolIndex−6) for ECP case).

For the case when the PDSCH-to-HARQ-timing-indicator field in the DCI format is N=1 bit-long, the bit-field may only indicate the whether or not to apply a half-slot offset in addition to the timing offset indicated by the first value indicated by the higher layer parameter dl-DataToUL-ACK. This mechanism can be extended to other variants using indication of the PDSCH to HARQ-ACK timing offset in units of 'k' symbols with value of 'k' other than 7 (or 6 for the ECP case). An advantage of the above mechanism is that the grouping of HARQ-ACK feedback to multiple PUCCH resources within a slot is realized by indicating this information using part of the slot offset indication instead of using additional DCI bits or alternative mechanisms, e.g., partitioning of PUCCH resource sets or partitioning of HARQ processes or based on RNTI.

In another embodiment, the PUCCH resource information corresponding to the PUCCH resources carrying multiple HARQ-ACK feedbacks, e.g., PUCCH formats, starting symbols, starting RBs (frequency-domain allocation), cyclic shifts, and code domain allocations, may be configured by a jointly encoded time domain resource allocation (TD-RA) table and dynamic indication of a combination of such parameters to the UE.

Referring back to the embodiment shown in FIG. 1, in case the updated/determined first PUCCH resource carrying the second UCI and the first HARQ-ACK feedback overlaps with the updated/determined second HARQ-ACK PUCCH resource (not shown), or if the second UCI and two non-overlapping HARQ-ACK PUCCH resources (as shown in FIG. 1) are considered for UCI multiplexing, and if the DCI format scheduling the second PDSCH is detected at least $N_3$ symbols before the first symbol of the first HARQ-ACK feedback resource (where $N_3$ is, for example, defined as "Capability #1" or "Capability #2" in Table 1 below), the UE may, according to an embodiment, multiplex all UCI including multiple HARQ-ACK feedbacks and the second UCI into one PUCCH resource, where ρ designates the subcarrier spacing SCS by way of the equation: $\Delta=2\mu\times15$ where $\Delta$ corresponds to the SCS expressed in kHz.

TABLE 1

N3 values for different SCS (μ) and
UE minimum processing time capabilities

| μ | Capability #1 | Capability #2 |
|---|---|---|
| 0 | 8 | 3 |
| 1 | 10 | 4.5 |
| 2 | 17 | 9 |
| 3 | 20 | N/A |

Figure 2:
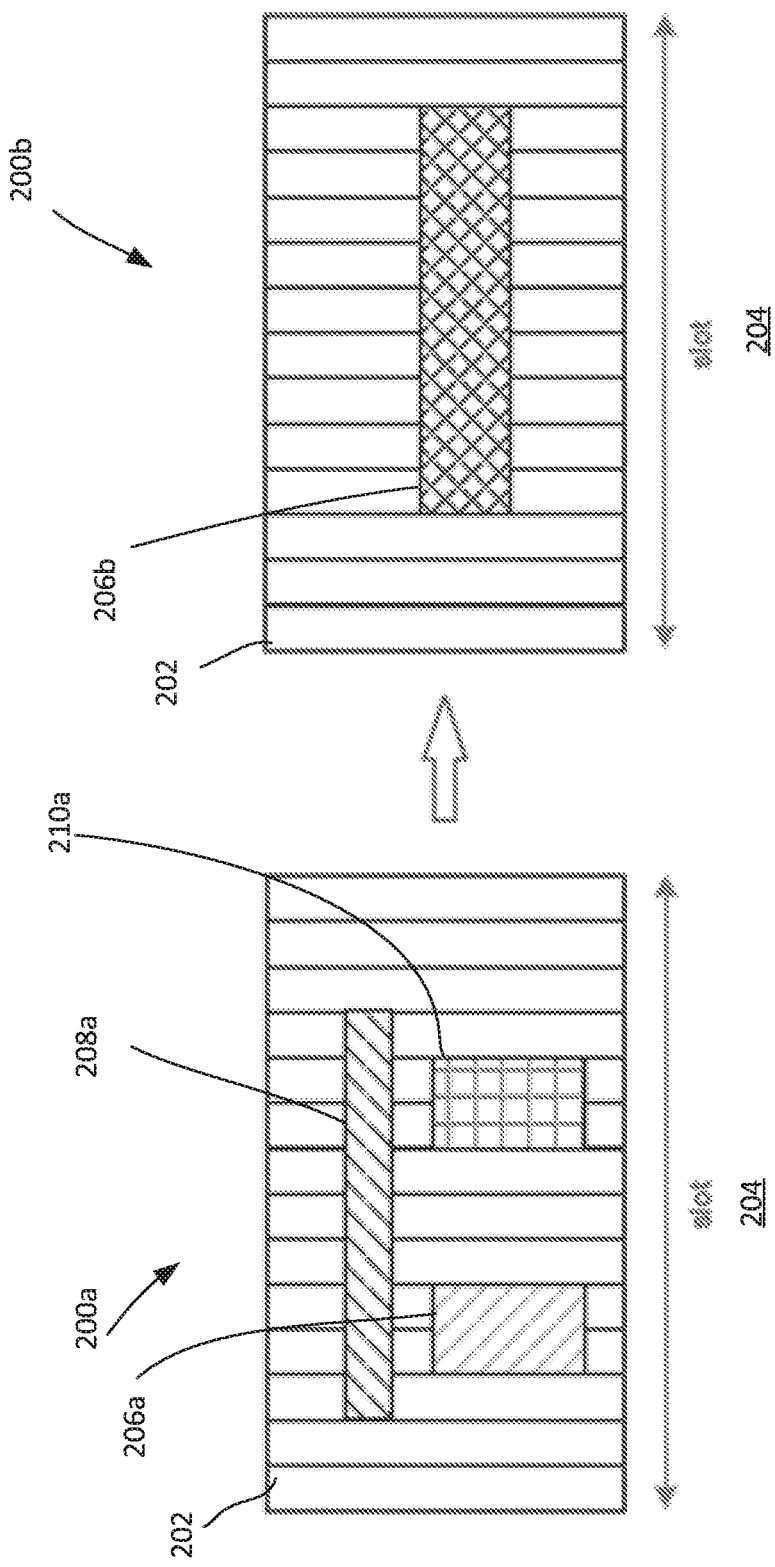
FIG. 2 illustrates time frequency resources showing a multiplexing of HARQ-ACK feedback with another UCI in a PUCCH resource in a single slot according to a second embodiment.

FIG. 2 illustrates one example of multiplexing two HARQ-ACKs and P/SP-CSI reports on PUCCH.

In particular, FIG. 2 shows respective time frequency resources 200a and 200b in symbols 202 of a slot 204, where resource 200a shows determined uplink resources prior to multiplexing of a first and second HARQ-ACK feedback with the second UCI, and resource 200b shows uplink resources updated after multiplexing of the first and second HARQ-ACK feedbacks with the second UCI according to one embodiment (updated uplink resources). In particular, in the example, as shown in FIG. 2, two PUCCH resources 206a and 210a to carry separate first and second HARQ-ACK feedbacks, respectively, are determined by the UE to overlap with another PUCCH 208a that is to carry P/SP CSI report. According to the UCI multiplexing procedure of one embodiment, uplink resources may be updated by the UE in the form of PUCCH 206b to carry the second UCI of PUCCH resource 208a along with the first and second HARQ-ACK feedbacks of PUCCH resource 206a. Given that the determined first PUCCH resource 206a does not overlap with the second determined HARQ-ACK PUCCH resource 210a in FIG. 2, the UE may therefore, according to this embodiment, transmit updated PUCCHs 206b carrying all UCIs in a same slot 204 as shown in FIG. 2. The PUCCH resource 206b may be determined based on the PRI field which is used to indicate the PUCCH carrying the first HARQ-ACK feedback.

According to one embodiment, when multiple HARQ-ACKs are multiplexed in one PUCCH resource (potentially multiplexed with any other UL report/information), the PUCCH resource carrying combined UCI may be determined in accordance with PUCCH resource indicator (PRI) which is used to indicate the PUCCH carrying the first or the last dynamic HARQ-ACK feedback among multiple HARQ-ACK feedbacks. More specifically, one PUCCH resource set may be determined based on the total payload size of the combined UCI. Further, the aforementioned PRI may be used to allow selection of one PUCCH resource from the determined PUCCH resource set.

Alternatively, the PUCCH resource carrying combined UCI may be determined in accordance with PUCCH resource indicator (PRI) which is included in the first or last DCI scheduling the PDSCHs where the corresponding HARQ-ACK feedbacks are scheduled in the same slot. In the case of carrier aggregation, the PRI may be included in the DCI which is transmitted with the lowest component carrier (CC) index.

According to one embodiment, the bit order of HARQ-ACK feedbacks within the combined UCI may follow the timing of one or more of: first symbol of each HARQ-ACK feedback in the same slot, the relative timing between the PDCCH monitoring occasions in which the corresponding scheduling DC's are detected, and the relative timing between the first or last symbol of the scheduled PDSCHs. For instance, assuming N HARQ-ACK feedbacks are scheduled in the same slot, the bit order of HARQ-ACK feedbacks within the combined UCI can be $1^{st}$ HARQ-ACK, $2^{nd}$ HARQ-ACK, ..., $N^{th}$ HARQ-ACK. Alternatively, the ordering of the HARQ-ACK feedback information may be determined according to the order of the HARQ process ID (PID) used to schedule the corresponding PDSCHs.

Figure 3:
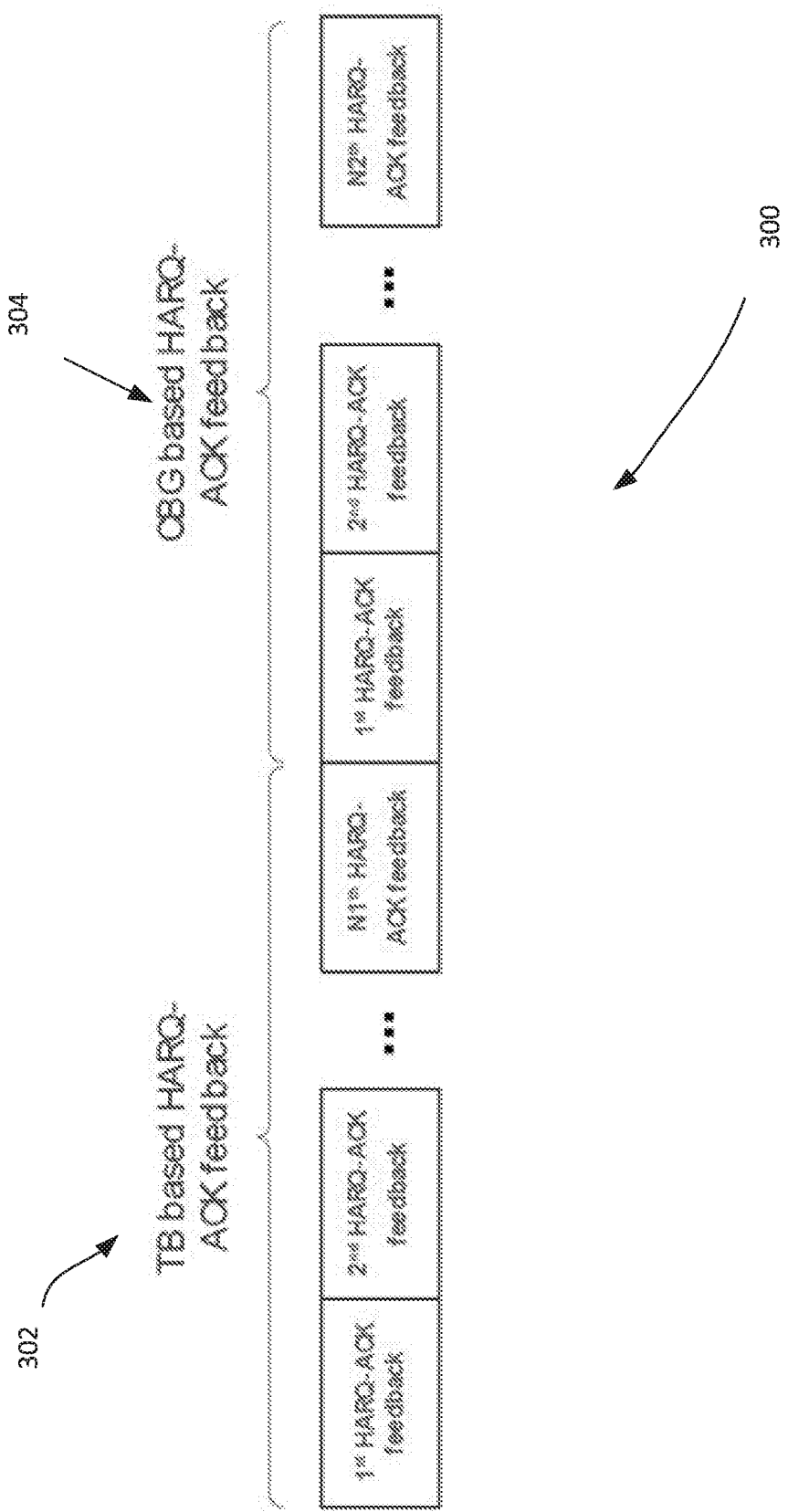
FIG. 3 illustrates a PUCCH resource carrying different types of HARQ-ACK feedback according to one embodiment.

FIG. 3 illustrates a PUCCH resource 300 showing one example of two HARQ-ACK codebooks for multiple HARQ-ACK feedbacks multiplexed therein. When both transport block (TB) based HARQ-ACK feedback codebook 302 and code block group (CBG) based HARQ-ACK feedback codebook 304 are configured, two separate HARQ-ACK codebooks may be carried by one PUCCH, such as PUCCH 300, according to some embodiments, wherein each HARQ-ACK codebook 302 and 304 includes multiple TB based HARQ-ACK feedbacks or CBG based HARQ-ACK feedbacks. In the example, TB based HARQ-ACK feedback and CBG based HARQ-ACK feedback are shown as being concatenated and carried by a PUCCH.

Note that the embodiment an example of which is shown in FIG. 3 may also be applied for the case where SPS HARQ-ACK feedbacks are concatenated with TB/CBG based HARQ-ACK feedback. If the payload size of the combined UCI exceeds the capacity of the determined PUCCH resource, certain portion of the CSI report including CSI part 1 and/or CSI part 2 may be dropped in accordance with the priority rule as defined in Section 5.2.5 of T538.214 V15.2.0.

Multiplexing Multiple HARQ-ACK Feedback Reports and PUSCH

Embodiments of multiplexing multiple HARQ-ACK feedback and PUSCHs are provided as follows below.

Figure 4:
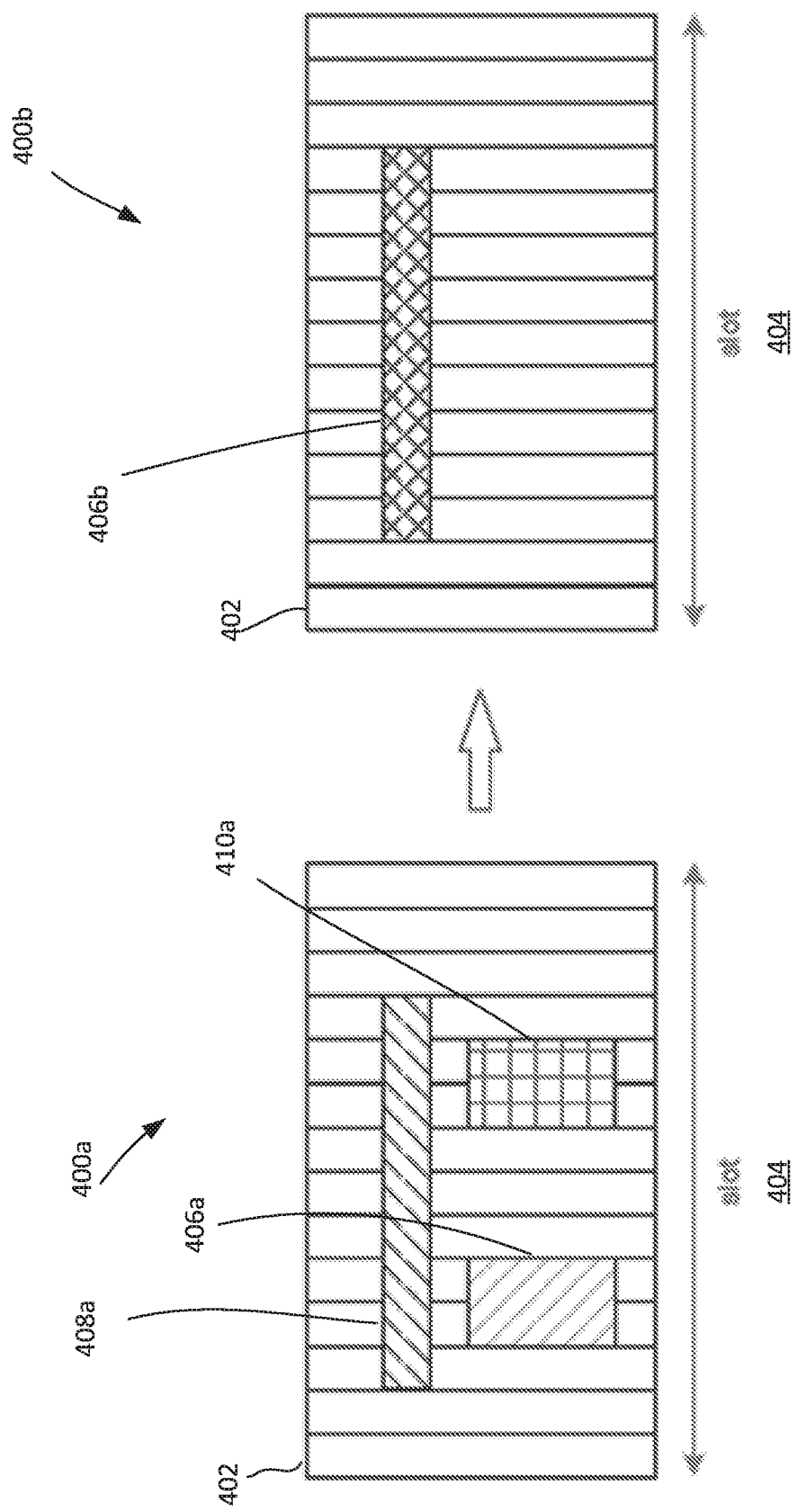
FIG. 4 illustrates time frequency resources showing a multiplexing of HARQ-ACK feedback with a Physical Uplink Shared Channel (PUSCH) resource according to one embodiment.

According to one embodiment, as shown by way of example in FIG. 4, when a plurality of PUCCH resources carrying dynamic or SPS HARQ-ACK feedback overlap with PUSCH, wherein PUCCHs and PUSCH are not distinguished based on service type or priority, and if the timeline requirement as noted above is satisfied, the UE may piggyback multiple HARQ-ACK feedbacks on PUSCH. This embodiment may also apply for the case when two non-overlapping SPS HARQ-ACK PUCCH resources overlap with the second UCI PUCCH. The second UCI may include periodic and/or semi-persistent scheduled CSI (P/SP-CSI) report and/or SR and/or SPS HARQ-ACK feedback.

Further, in one option, multiple HARQ-ACK feedbacks may be mapped onto a PUSCH resource separately. The amount of resources for each HARQ-ACK feedback may be calculated in accordance with the corresponding HARQ-ACK payload size and configured/indicated beta offset. Further, the multiple HARQ-ACK feedbacks may be mapped sequentially on PUSCH based on one or more of: the transmission timing of the first symbol HARQ-ACK feedback, the relative timing between the PDCCH monitoring occasions in which the corresponding scheduling DC's are detected, and the relative timing between the first or last symbol of the scheduled PDSCHs. In one example, the earliest HARQ-ACK feedback in a slot is mapped first and second HARQ-ACK feedback is mapped after the first HARQ-ACK feedback, etc. Alternatively, the ordering of the mapping of the HARQ-ACK feedback information may be determined according to the order of the HARQ process ID (PID) used to schedule the corresponding PDSCHs.

In yet another option, the information bits of multiple HARQ-ACK feedbacks may be first concatenated. The bit order of HARQ-ACK feedbacks can be defined similar to the aforementioned embodiments, as shown for example in the context of FIG. 3. Subsequently, the concatenated HARQ-ACK feedbacks may be modulated and mapped on PUSCH. The amount of resource allocated for combined HARQ-ACK may calculated in accordance with the concatenated HARQ-ACK payload size and configured/indicated beta offset.

FIG. 4 illustrates one example of multiplexing two HARQ-ACK feedbacks with PUSCH, including multiplexing two HARQ-ACKs and a PUSCH in a slot 104 with symbols 102. In particular, FIG. 4 shows respective time frequency resources 400a and 400b, where resource 400b shows determined uplink resources prior to multiplexing of a first and second HARQ-ACK feedback with a PUSCH, and resource 100b shows uplink resources updated after multiplexing of the first and second HARQ-ACK feedbacks with the PUSCH according to one embodiment (updated uplink resources). In particular, in the example, as shown in FIG. 4, two PUCCH resources 406a and 410a to carry separate first and second HARQ-ACK feedbacks, respectively, are determined by the UE to overlap with a PUSCH 408a. According to the HARQ-ACK and PUSCH multiplexing procedure of one embodiment, uplink resources may be updated by the UE in the form of PUCCH 406b to carry the PUSCH 408a along with the first and second HARQ-ACK feedbacks of PUCCH resources 406a and 410a, respectively. Given that the determined first PUCCH resource 406a does not overlap with the second determined HARQ-ACK PUCCH resource 410a in FIG. 4, the UE may therefore, according to this embodiment, transmit updated PUCCHs 406b in a slot 404 as shown in FIG. 4. This, in this embodiment, two PUCCHs carrying separate HARQ-ACK feedbacks overlap with PUSCH. According to aforementioned examples, two HARQ-ACK feedbacks may be combined together and piggyback combined HARQ-ACK feedbacks on PUSCH.

Figure 5:
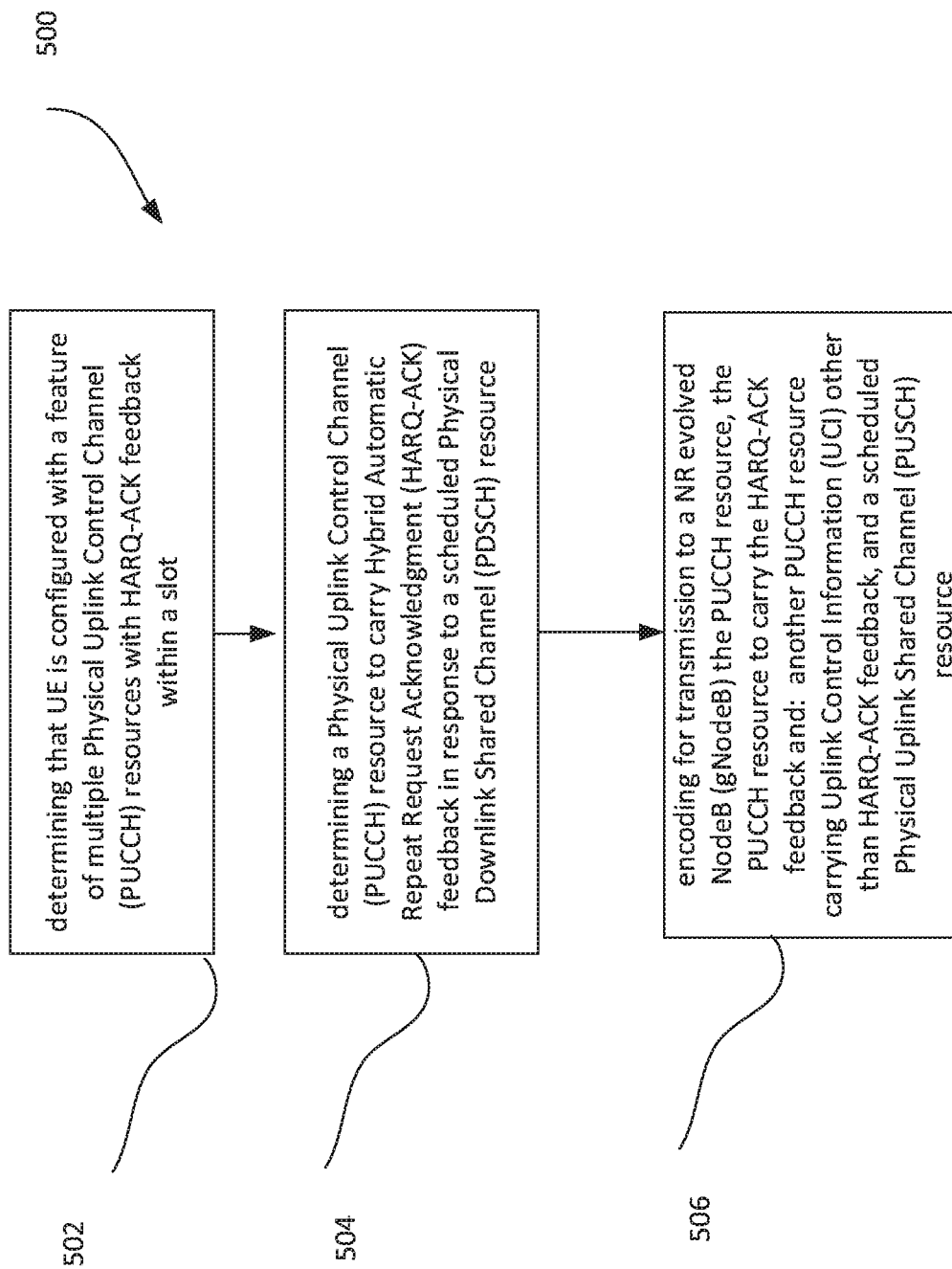
FIG. 5 illustrates a process according to an embodiment.

Referring to FIG. 5, a process 500 according to one embodiment includes at operation 502, determining that UE is configured with a feature of multiple Physical Uplink Control Channel (PUCCH) resources with HARQ-ACK feedback within a slot; at operation 504, determining a Physical Uplink Control Channel (PUCCH) resource to carry Hybrid Automatic Repeat Request Acknowledgment (HARQ-ACK) feedback in response to a scheduled Physical Downlink Shared Channel (PDSCH) resource; and at operation 506, encoding for transmission to a NR evolved NodeB (gNodeB) the PUCCH resource, the PUCCH resource to carry the HARQ-ACK feedback and: another PUCCH resource carrying Uplink Control Information (UCI) other than HARQ-ACK feedback, and a scheduled Physical Uplink Shared Channel (PUSCH) resource.

Figure 6:
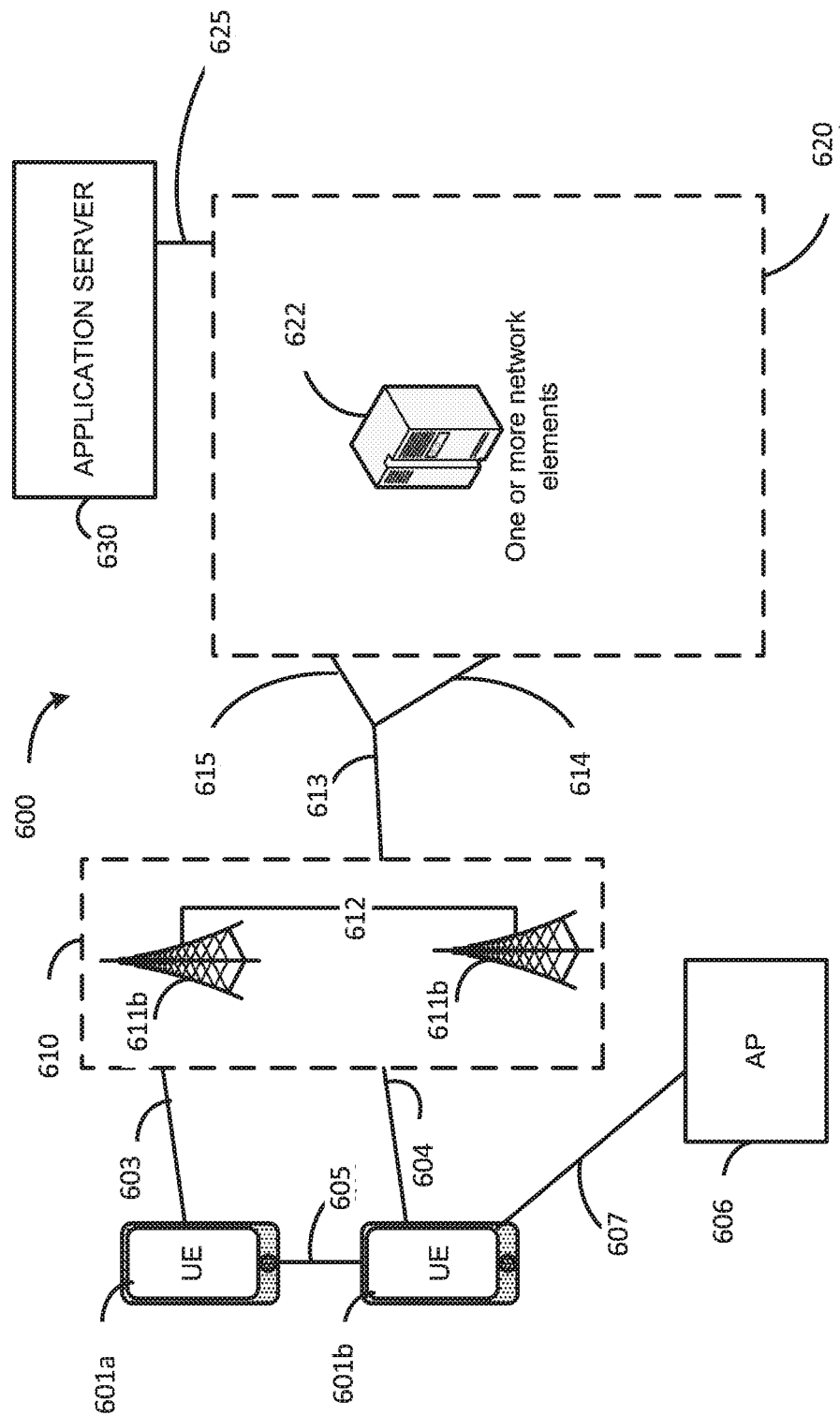
FIG. 6 illustrates an architecture of a system of a network according to some embodiments.

FIG. 6 illustrates an architecture of a system 600 of a network according to some embodiments. The system 600 is shown to include a user equipment (UE) 601 and a UE 602. The UEs 601 and 602 are illustrated as smartphones (e.g., handheld touchscreen mobile computing devices connectable to one or more cellular networks) but may also comprise any mobile or non-mobile computing device.

The UEs 601 and 602 may be configured to connect, e.g., communicatively couple, with a radio access network (RAN) 610. The UEs 601 and 602 utilize connections 603 and 604, respectively, each of which comprises a physical communications interface or layer (discussed in further detail below); in this example, the connections 603 and 604 are illustrated as an air interface to enable communicative coupling and may be consistent with cellular communications protocols.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 may comprise a local wireless connection, such as a connection consistent with any IEEE 802.11 protocol, wherein the AP 606 would comprise a wireless fidelity (WiFi®) router. In this example, the AP 606 is shown to be connected to the Internet without connecting to the core network of the wireless system (described in further detail below).

The RAN 610 may include one or more access nodes that enable the connections 603 and 604. These access nodes (ANs) may be referred to as base stations (BSs), NodeBs, evolved NodeBs (eNBs), next Generation or New Radio evolved NodeBs (gNodeB), RAN nodes, and so forth, and may comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

According to some embodiments, the UEs 601 and 602 may be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals may comprise a plurality of orthogonal subcarriers.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and the serving gateway (S-GW) 622, and the S1-mobility management entity (MME) interface 615, which is a signalling interface between the RAN nodes 611 and 612 and MMEs 621.

The CN 620 includes network elements. The term "network element" may describe a physical or virtualized equipment used to provide wired or wireless communication network services. In this embodiment, the CN 620 comprises, as network elements, the MMEs 621, the S-GW 622, the Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN).

Figure 7:
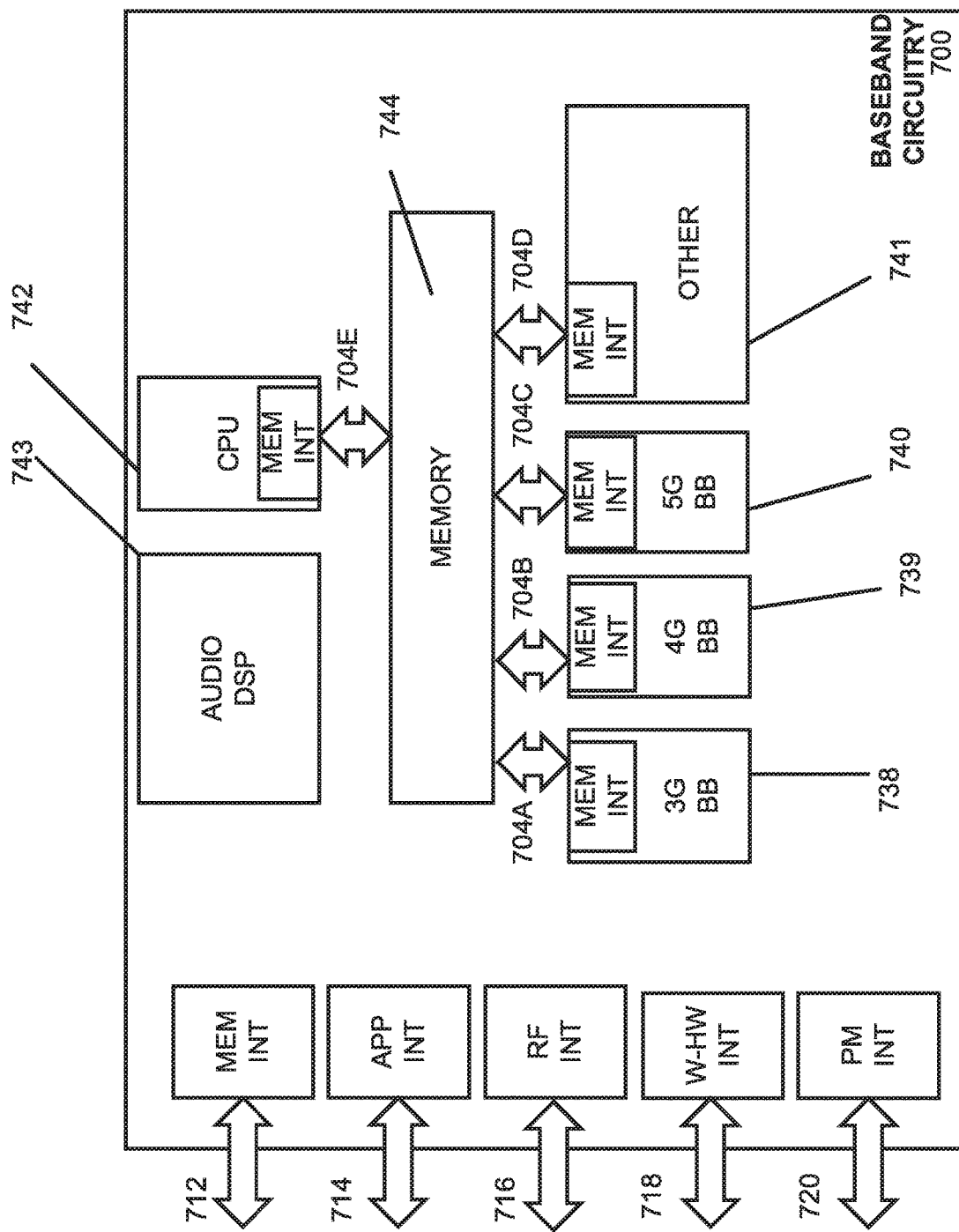
FIG. 7 illustrates example interfaces of baseband circuitry according to various embodiments.

FIG. 7 illustrates example interfaces of baseband circuitry according to various embodiments. The baseband circuitry 700 may be included in a UE or gNodeB, for example, in UE or gNodeB of FIG. 6, and may comprise processors 738-742 and a memory 744 utilized by said processors. Each of the processors 738-732 may include a memory interface, 704A-704E, respectively, to send/receive data to/from the memory 744. Baseband circuitry 700 may also include an audio digital signal processor (Audio DSP) 743.

The baseband circuitry 700 may further include one or more interfaces to communicatively couple to other circuitries/devices, such as a memory interface 712 (e.g., an interface to send/receive data to/from memory external to the baseband circuitry 700), an application circuitry interface 714 (e.g., an interface to send/receive data to/from application circuitry), an RF circuitry interface 716 (e.g., an interface to send/receive data to/from an RF circuitry), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from a power management integrated circuit (PMIC).

The components of FIGS. 6 and/or 7, such as the shown UEs and gNodeB's, may be used in any of the embodiments described herein.

The examples set forth herein are illustrative and not exhaustive.

Example 1 includes a device of a New Radio (NR) User Equipment (UE) the device including a Radio Frequency (RF) interface, and processing circuitry coupled to the RF interface, the processing circuitry to: determine an overlap between a plurality of determined Physical Uplink Control Channel (PUCCH) resources to carry respective Hybrid Automatic Repeat Request Acknowledgment (HARQ-ACK) feedbacks and one of another determined PUCCH resource to carry an Uplink Control Information (UCI) or a determined Physical Uplink Shared Channel (PUSCH) resource to carry data; and encode for transmission to a NR evolved NodeB (gNodeB) an updated PUCCH resource carrying at least one of the plurality of HARQ-ACK feedbacks and the UCI of said another determined PUCCH resource, or an updated PUSCH resource carrying the data along with the plurality of HARQ-ACK feedbacks.

Example 2 includes the subject matter of Example 1, and optionally, wherein: the plurality of determined PUCCH resources include a first determined PUCCH resource and a second determined PUCCH resource; the plurality of HARQ-ACK feedbacks include a first HARQ-ACK feedback and a second HARQ-ACK feedback corresponding to the first determined PUCCH resource and the second determined PUCCH resource, respectively; the updated PUCCH resource is to carry the UCI of said another PUCCH resource and one of the first HARQ-ACK feedback or the second HARQ-ACK feedback; the updated PUCCH resource, the first determined PUCCH resource and the second determined PUCCH resource are of a same service or priority type; and the processing circuitry is to: encode the updated PUCCH resource and the second determined PUCCH resource for transmission in one slot if the updated PUCCH resource is to carry the first HARQ-ACK feedback and in response to a determination that the updated PUCCH resource does not overlap with the second determined PUCCH resource and that one of the updated PUCCH resource or the second determined PUCCH resource is a short PUCCH resource; and encode the updated PUCCH resource and the first determined PUCCH resource for transmission in one slot if the updated PUCCH resource is to carry the second HARQ-ACK feedback and in response to a determination that the updated PUCCH resource does not overlap with the first determined PUCCH resource and that one of the updated PUCCH resource or the first determined PUCCH resource is a short PUCCH resource.

Example 3 includes the subject matter of Example 1, and optionally, wherein the processing circuitry is to: decode a Downlink Control Information (DCI) from a NR evolved Node B (gNodeB), the DCI including a PUCCH resource indicator (PRI) field; and determine the updated PUCCH resource based the PUCCH resource indicator field in the DCI.

Example 4 includes the subject matter of Example 3, and optionally, wherein: the updated PUCCH resource is to carry the UCI of said another determined PUCCH resource and at least one of the plurality of HARQ-ACK feedbacks from a corresponding at least one of the plurality of determined PUCCH resources; and the processing circuitry is to: encode for transmission in one slot the updated PUCCH resource and remaining PUCCH resources of the plurality of determined PUCCH resources carrying remaining HARQ-ACK feedbacks of the plurality of HARQ-ACK feedbacks; and determine the updated PUCCH resource and the remaining PUCCH resources based on a combination of the PRI field and a K1 offset indicated to the UE by the gNodeB.

Example 5 includes the subject matter of Example 4, and optionally, wherein the processing circuitry is to determine the K1 by decoding one of a Physical Downlink Shared Channel (PDSCH) resource to HARQ tinning indicator (PDSCH-to-HARQ-timing-indicator) field in the DCI or a higher layer parameter downlink data to uplink acknowledgment (dl-DataToUL-ACK) from the gNodeB.

Example 6 includes the subject matter of Example 5, and optionally, wherein the PRI indicates a starting PUCCH symbol for each of the updated PUCCH resource and the remaining PUCCH resources, and wherein the processing circuitry is to determine, in units of slots, half-slots or a set of one or more symbols, a PDSCH-end to HARQ-ACK-start timing offset using a combination of the starting PUCCH symbol and a value of the PDSCH-to-HARQ-timing-indicator field.

Example 7 includes the subject matter of Example 3, and optionally, wherein: the updated PUCCH resource is to carry the UCI of said another determined PUCCH resource and the plurality of HARQ-ACK feedbacks; and the processing circuitry is to determine the updated PUCCH resource based on the PRI field, the PRI field indicating a PUCCH resource carrying a first or a last dynamic HARQ-ACK feedback of the plurality of HARQ-ACK feedbacks, wherein a resource set of the updated PUCCH resource is based on a total payload size of the plurality of HARQ-ACK feedbacks and of the UCI of said another determined PUCCH resource.

Example 8 includes the subject matter of Example 3, and optionally, wherein the DCI is a first or last DCI scheduling a Physical Downlink Shared Channel (PDSCH) for which the plurality of HARQ-ACK feedbacks are to be scheduled, and wherein the plurality of HARQ-ACK feedbacks in the updated PUCCH resource are to be scheduled in a slot.

Example 9 includes the subject matter of Example 1, and optionally, wherein a bit order in a same slot of said at least one of the plurality of HARQ-ACK feedbacks is to follow a timing of the said at least one of the plurality of HARQ-ACK feedbacks.

Example 10 includes the subject matter of Example 1, and optionally, wherein an ordering of a mapping of information for said at least one of the plurality of HARQ-ACK feedbacks is based on an order of HARQ process identifications (PIDs) used to schedule corresponding Physical Downlink Shared Channel (PDSCH) resources.

Example 11 includes the subject matter of Example 1, and optionally, wherein the at least one of the plurality of HARQ-ACK feedbacks includes transport block (TB) based HARQ-ACK feedbacks and code block group (CBG) based HARQ-ACK feedbacks, the updated PUCCH resource to carry two separate HARQ-ACK codebooks corresponding to the TB based HARQ-ACK feedbacks and to the CBG based HARQ-ACK feedbacks respectively.

Example 12 includes the subject matter of Example 1, and optionally, wherein: the plurality of HARQ-ACK feedbacks include dynamic HARQ-ACK feedbacks and semi-persistent scheduling HARQ-ACK feedbacks; and the processing circuitry is to encode the updated PUSCH resource to carry the UCI of said another PUCCH resource and the HARQ-ACK feedbacks in response to a determination that the updated PUSCH resource and the plurality of determined PUCCH resources are of a same service or priority type.

Example 13 includes the subject matter of Example 12, and optionally, wherein the processing circuitry is to encode the updated PUSH by mapping the plurality of HARQ-ACK feedbacks into the updated PUSCH separately and by allocating an amount of resources for each HARQ-ACK feedback based on a payload size and a beta offset of each respective one of the plurality of HARQ-ACK feedbacks.

Example 14 includes the subject matter of Example 12, and optionally, wherein the processing circuitry is to concatenate information bits of the plurality of HARQ-ACK feedbacks to multiplex the HARQ-ACK feedbacks into the updated PUSCH.

Example 15 includes the device of any one of Examples 1-14, further including a front end module coupled to the RF interface.

Example 16 includes the subject matter of Example 15, and optionally, further including one or more antennas coupled to the front end module to transmit the updated PUCCH resource or updated PUSCH resource.

Example 17 includes a method to be performed at a device of a New Radio (NR) User Equipment (UE), the method including: determining an overlap between a plurality of determined Physical Uplink Control Channel (PUCCH) resources to carry respective Hybrid Automatic Repeat Request Acknowledgment (HARQ-ACK) feedbacks and one of another determined PUCCH resource to carry an Uplink Control Information (UCI) or a determined Physical Uplink Shared Channel (PUSCH) resource to carry data; and encoding for transmission to a NR evolved NodeB (gNodeB) an updated PUCCH resource carrying at least one of the plurality of HARQ-ACK feedbacks and the UCI of said another determined PUCCH resource, or an updated PUSCH resource carrying the data along with the plurality of HARQ-ACK feedbacks.

Example 18 includes the subject matter of Example 17, and optionally, wherein: the plurality of determined PUCCH resources include a first determined PUCCH resource and a second determined PUCCH resource; the plurality of HARQ-ACK feedbacks include a first HARQ-ACK feedback and a second HARQ-ACK feedback corresponding to the first determined PUCCH resource and the second determined PUCCH resource, respectively; the updated PUCCH resource is to carry the UCI of said another PUCCH resource and one of the first HARQ-ACK feedback or the second HARQ-ACK feedback; the updated PUCCH resource, the first determined PUCCH resource and the second determined PUCCH resource are of a same service or priority type; and the method further includes: encoding the updated PUCCH resource and the second determined PUCCH resource for transmission in one slot if the updated PUCCH resource is to carry the first HARQ-ACK feedback and in response to a determination that the updated PUCCH resource does not overlap with the second determined PUCCH resource and that one of the updated PUCCH resource or the second determined PUCCH resource is a short PUCCH resource; and encoding the updated PUCCH resource and the first determined PUCCH resource for transmission in one slot if the updated PUCCH resource is to carry the second HARQ-ACK feedback and in response to a determination that the updated PUCCH resource does not overlap with the first determined PUCCH resource and that one of the updated PUCCH resource or the first determined PUCCH resource is a short PUCCH resource.

Example 19 includes the subject matter of Example 17, and optionally, the method further including: decoding a Downlink Control Information (DCI) from a NR evolved Node B (gNodeB), the DCI including a PUCCH resource indicator (PRI) field; and determining the updated PUCCH resource based the PUCCH resource indicator field in the DCI.

Example 20 includes the subject matter of Example 19, and optionally, wherein: the updated PUCCH resource is to carry the UCI of said another determined PUCCH resource and at least one of the plurality of HARQ-ACK feedbacks from a corresponding at least one of the plurality of determined PUCCH resources; and the method further includes: encoding for transmission in one slot the updated PUCCH resource and remaining PUCCH resources of the plurality of determined PUCCH resources carrying remaining HARQ-ACK feedbacks of the plurality of HARQ-ACK feedbacks; and determining the updated PUCCH resource and the remaining PUCCH resources based on a combination of the PRI field and a K1 offset indicated to the UE by the gNodeB.

Example 21 includes the subject matter of Example 20, and optionally, further including determining the K1 offset by decoding one of a Physical Downlink Shared Channel (PDSCH) resource to HARQ timing indicator (PDSCH-to-HARQ-timing-indicator) field in the DCI or a higher layer parameter downlink data to uplink acknowledgment (dl-DataToUL-ACK) from the gNodeB.

Example 22 includes the subject matter of Example 21, and optionally, wherein the PRI indicates a starting PUCCH symbol for each of the updated PUCCH resource and the remaining PUCCH resources, and wherein the method further includes determining, in units of slots, half-slots or a set of one or more symbols, a PDSCH-end to HARQ-ACK-start timing offset using a combination of the starting PUCCH symbol and a value of the PDSCH-to-HARQ-timing-indicator field.

Example 23 includes the subject matter of Example 19, and optionally, wherein: the updated PUCCH resource is to carry the UCI of said another determined PUCCH resource and the plurality of HARQ-ACK feedbacks; and the method further includes determining the updated PUCCH resource based on the PRI field, the PRI field indicating a PUCCH resource carrying a first or a last dynamic HARQ-ACK feedback of the plurality of HARQ-ACK feedbacks, wherein a resource set of the updated PUCCH resource is based on a total payload size of the plurality of HARQ-ACK feedbacks and of the UCI of said another determined PUCCH resource.

Example 24 includes the subject matter of Example 19, and optionally, wherein the DCI is a first or last DCI scheduling a Physical Downlink Shared Channel (PDSCH) for which the plurality of HARQ-ACK feedbacks are to be scheduled, and wherein the plurality of HARQ-ACK feedbacks in the updated PUCCH resource are to be scheduled in a slot.

Example 25 includes the subject matter of Example 17, and optionally, wherein a bit order in a same slot of said at least one of the plurality of HARQ-ACK feedbacks is to follow a timing of the said at least one of the plurality of HARQ-ACK feedbacks.

Example 26 includes the subject matter of Example 17, and optionally, wherein an ordering of a mapping of information for said at least one of the plurality of HARQ-ACK feedbacks is based on an order of HARQ process identifications (PIDs) used to schedule corresponding Physical Downlink Shared Channel (PDSCH) resources.

Example 27 includes the subject matter of Example 17, and optionally, wherein the at least one of the plurality of HARQ-ACK feedbacks includes transport block (TB) based HARQ-ACK feedbacks and code block group (CBG) based HARQ-ACK feedbacks, the updated PUCCH resource to carry two separate HARQ-ACK codebooks corresponding to the TB based HARQ-ACK feedbacks and to the CBG based HARQ-ACK feedbacks respectively.

Example 28 includes the subject matter of Example 17, and optionally, wherein: the plurality of HARQ-ACK feedbacks include dynamic HARQ-ACK feedbacks and semi-persistent scheduling HARQ-ACK feedbacks; and the method further includes encoding the updated PUSCH resource to carry the UCI of said another PUCCH resource and the HARQ-ACK feedbacks in response to a determination that the updated PUSCH resource and the plurality of determined PUCCH resources are of a same service or priority type.

Example 29 includes the subject matter of Example 28, and optionally, further including encoding the updated PUSH by mapping the plurality of HARQ-ACK feedbacks into the updated PUSCH separately and by allocating an amount of resources for each HARQ-ACK feedback based on a payload size and a beta offset of each respective one of the plurality of HARQ-ACK feedbacks.

Example 30 includes the subject matter of Example 28, and optionally, further including concatenating information bits of the plurality of HARQ-ACK feedbacks to multiplex the HARQ-ACK feedbacks into the updated PUSCH.

Example 31 includes a device of a New Radio (NR) User Equipment (UE), the device including: means for determining an overlap between a plurality of determined Physical Uplink Control Channel (PUCCH) resources to carry respective Hybrid Automatic Repeat Request Acknowledgment (HARQ-ACK) feedbacks and one of another determined PUCCH resource to carry an Uplink Control Information (UCI) or a determined Physical Uplink Shared Channel (PUSCH) resource to carry data; and means for encoding for transmission to a NR evolved NodeB (gNodeB) an updated PUCCH resource carrying at least one of the plurality of HARQ-ACK feedbacks and the UCI of said another determined PUCCH resource, or an updated PUSCH resource carrying the data along with the plurality of HARQ-ACK feedbacks.

Example 32 includes the subject matter of Example 31, and optionally, wherein: the plurality of determined PUCCH resources include a first determined PUCCH resource and a second determined PUCCH resource; the plurality of HARQ-ACK feedbacks include a first HARQ-ACK feedback and a second HARQ-ACK feedback corresponding to the first determined PUCCH resource and the second determined PUCCH resource, respectively; the updated PUCCH resource is to carry the UCI of said another PUCCH resource and one of the first HARQ-ACK feedback or the second HARQ-ACK feedback; the updated PUCCH resource, the first determined PUCCH resource and the second determined PUCCH resource are of a same service or priority type; and the device further includes: means for encoding the updated PUCCH resource and the second determined PUCCH resource for transmission in one slot if the updated PUCCH resource is to carry the first HARQ-ACK feedback and in response to a determination that the updated PUCCH resource does not overlap with the second determined PUCCH resource and that one of the updated PUCCH resource or the second determined PUCCH resource is a short PUCCH resource; and means for encoding the updated PUCCH resource and the first determined PUCCH resource for transmission in one slot if the updated PUCCH resource is to carry the second HARQ-ACK feedback and in response to a determination that the updated PUCCH resource does not overlap with the first determined PUCCH resource and that one of the updated PUCCH resource or the first determined PUCCH resource is a short PUCCH resource.

Example 33 includes a device of a New Radio (NR) evolved NodeB (gNodeB), the device including a Radio Frequency (RF) interface, and processing circuitry coupled to the RF interface, the processing circuitry to: encode a Downlink Control Information (DCI) for transmission to a NR User Equipment (UE), the DCI including a PUCCH resource indicator (PRI) field to allow a UE to determine an updated Physical Uplink Control Channel (PUCCH) resource from the PRI, wherein the updated PUCCH resource is to carry at least one HARQ-ACK feedback of a plurality of HARQ-ACK feedbacks corresponding to a plurality of determined PUCCH resources of the UE respectively, and an Uplink Control Information (UCI) of another determined PUCCH resource of the UE; and decode the updated PUCCH from the UE.

Example 34 includes the subject matter of Example 33, and optionally, wherein: the updated PUCCH resource is to carry the at least one HARQ-ACK feedback, and remaining PUCCH resources of the plurality of determined PUCCH resources carrying respective remaining HARQ-ACK feedbacks of the plurality of HARQ-ACK feedbacks; and the processing circuitry is to encode for transmission to the UE a K1 offset, a combination of the PRI field and a K1 offset to allow the UE to determine the updated PUCCH resource and the remaining PUCCH resources.

Example 35 includes the subject matter of Example 34, and optionally, wherein the K1 offset is based on one of a Physical Downlink Shared Channel (PDSCH) resource to HARQ timing indicator (PDSCH-to-HARQ-timing-indicator) field in the DCI or a higher layer parameter downlink data to uplink acknowledgment (dl-DataToUL-ACK) from the gNodeB to the UE.

Example 36 includes the subject matter of Example 35, and optionally, wherein the PRI indicates a starting PUCCH symbol for each of the updated PUCCH resource and the remaining PUCCH resources, and wherein, a combination of the starting PUCCH symbol and a value of the PDSCH-to-HARQ-timing-indicator field is to allow the UE to determine a PDSCH-end to HARQ-ACK-start timing offset in units of slots, half-slots or a set of one or more symbols.

Example 37 includes the subject matter of Example 33, and optionally, wherein: the updated PUCCH resource is to carry the UCI of said another determined PUCCH resource and the plurality of HARQ-ACK feedbacks; and the PRI field indicates a PUCCH resource carrying a first or a last dynamic HARQ-ACK feedback of the plurality of HARQ-ACK feedbacks, wherein a resource set of the updated PUCCH resource is based on a total payload size of the plurality of HARQ-ACK feedbacks and of the UCI of said another determined PUCCH resource.

Example 38 includes the subject matter of Example 33, and optionally, wherein the DCI is a first or last DCI scheduling a Physical Downlink Shared Channel (PDSCH) for which the plurality of HARQ-ACK feedbacks are to be scheduled, and wherein the plurality of HARQ-ACK feedbacks in the updated PUCCH resource are to be scheduled in a slot.

Example 39 includes the subject matter of Example 33, and optionally, wherein a bit order in a same slot of said at least one of the plurality of HARQ-ACK feedbacks is to follow a timing of the said at least one of the plurality of HARQ-ACK feedbacks.

Example 40 includes the subject matter of Example 33, and optionally, wherein an ordering of a mapping of information for said at least one of the plurality of HARQ-ACK feedbacks is based on an order of HARQ process identifications (PIDs) used to schedule corresponding Physical Downlink Shared Channel (PDSCH) resources.

Example 41 includes the subject matter of Example 33, and optionally, wherein the at least one of the plurality of HARQ-ACK feedbacks includes transport block (TB) based HARQ-ACK feedbacks and code block group (CBG) based HARQ-ACK feedbacks, the updated PUCCH resource to carry two separate HARQ-ACK codebooks corresponding to the TB based HARQ-ACK feedbacks and to the CBG based HARQ-ACK feedbacks respectively.

Example 42 includes the subject matter of any one of Examples 33-41, and optionally, further including a front end module coupled to the RF interface.

Example 43 includes the subject matter of Example 42, and optionally, further including one or more antennas coupled to the front end module to transmit the DCI and to receive the updated PUCCH.

Example 44 includes a method to be used at a device of a New Radio (NR) evolved NodeB (gNodeB), the method including: encoding a Downlink Control Information (DCI) for transmission to a NR User Equipment (UE), the DCI including a PUCCH resource indicator (PRI) field to allow a UE to determine an updated Physical Uplink Control Channel (PUCCH) resource from the PRI, wherein the updated PUCCH resource is to carry at least one HARQ-ACK feedback of a plurality of HARQ-ACK feedbacks corresponding to a plurality of determined PUCCH resources of the UE respectively, and an Uplink Control Information (UCI) of another determined PUCCH resource of the UE; and decoding the updated PUCCH from the UE.

Example 45 includes the subject matter of Example 44, and optionally, wherein: the updated PUCCH resource is to carry the at least one HARQ-ACK feedback, and remaining PUCCH resources of the plurality of determined PUCCH resources carrying respective remaining HARQ-ACK feedbacks of the plurality of HARQ-ACK feedbacks; and the method includes encoding for transmission to the UE a K1 offset, a combination of the PRI field and a K1 offset to allow the UE to determine the updated PUCCH resource and the remaining PUCCH resources.

Example 46 includes the subject matter of Example 45, and optionally, wherein the K1 offset is based on one of a Physical Downlink Shared Channel (PDSCH) resource to HARQ timing indicator (PDSCH-to-HARQ-timing-indicator) field in the DCI or a higher layer parameter downlink data to uplink acknowledgment (dl-DataToUL-ACK) from the gNodeB to the UE.

Example 47 includes the subject matter of Example 46, and optionally, wherein the PRI indicates a starting PUCCH symbol for each of the updated PUCCH resource and the remaining PUCCH resources, and wherein, a combination of the starting PUCCH symbol and a value of the PDSCH-to-HARQ-timing-indicator field is to allow the UE to determine a PDSCH-end to HARQ-ACK-start timing offset in units of slots, half-slots or a set of one or more symbols.

Example 48 includes the subject matter of Example 44, and optionally, wherein: the updated PUCCH resource is to carry the UCI of said another determined PUCCH resource and the plurality of HARQ-ACK feedbacks; and the PRI field indicates a PUCCH resource carrying a first or a last dynamic HARQ-ACK feedback of the plurality of HARQ-ACK feedbacks, wherein a resource set of the updated PUCCH resource is based on a total payload size of the plurality of HARQ-ACK feedbacks and of the UCI of said another determined PUCCH resource.

Example 49 includes the subject matter of Example 44, and optionally, wherein the DCI is a first or last DCI scheduling a Physical Downlink Shared Channel (PDSCH) for which the plurality of HARQ-ACK feedbacks are to be scheduled, and wherein the plurality of HARQ-ACK feedbacks in the updated PUCCH resource are to be scheduled in a slot.

Example 50 includes the subject matter of Example 44, and optionally, wherein a bit order in a same slot of said at least one of the plurality of HARQ-ACK feedbacks is to follow a timing of the said at least one of the plurality of HARQ-ACK feedbacks.

Example 51 includes the subject matter of Example 44, and optionally, wherein an ordering of a mapping of information for said at least one of the plurality of HARQ-ACK feedbacks is based on an order of HARQ process identifications (PIDs) used to schedule corresponding Physical Downlink Shared Channel (PDSCH) resources.

Example 52 includes the subject matter of Example 44, and optionally, wherein the at least one of the plurality of HARQ-ACK feedbacks includes transport block (TB) based HARQ-ACK feedbacks and code block group (CBG) based HARQ-ACK feedbacks, the updated PUCCH resource to carry two separate HARQ-ACK codebooks corresponding to the TB based HARQ-ACK feedbacks and to the CBG based HARQ-ACK feedbacks respectively.

Example 53 includes a device of a New Radio (NR) evolved NodeB (gNodeB) including: means for encoding a Downlink Control Information (DCI) for transmission to a NR User Equipment (UE), the DCI including a PUCCH resource indicator (PRI) field to allow a UE to determine an updated Physical Uplink Control Channel (PUCCH) resource from the PRI, wherein the updated PUCCH resource is to carry at least one HARQ-ACK feedback of a plurality of HARQ-ACK feedbacks corresponding to a plurality of determined PUCCH resources of the UE respectively, and an Uplink Control Information (UCI) of another determined PUCCH resource of the UE; and means for decoding the updated PUCCH from the UE.

Example 54 includes the subject matter of Example 53, and optionally, wherein: the updated PUCCH resource is to carry the at least one HARQ-ACK feedback, and remaining PUCCH resources of the plurality of determined PUCCH resources carrying respective remaining HARQ-ACK feedbacks of the plurality of HARQ-ACK feedbacks; and the device includes means for encoding for transmission to the UE a K1 offset, a combination of the PRI field and a K1 offset to allow the UE to determine the updated PUCCH resource and the remaining PUCCH resources.

Example 55 includes a device of a New Radio (NR) User Equipment (UE) the device including a Radio Frequency (RF) interface, and processing circuitry coupled to the RF interface, the processing circuitry to: determine that the UE is configured with a feature of multiple Physical Uplink Control Channel (PUCCH) resources with HARQ-ACK feedback within a slot; determine a Physical Uplink Control Channel (PUCCH) resource to carry Hybrid Automatic Repeat Request Acknowledgment (HARQ-ACK) feedback in response to a scheduled Physical Downlink Shared Channel (PDSCH) resource; and encode for transmission to a NR evolved NodeB (gNodeB) the PUCCH resource, the PUCCH resource to carry the HARQ-ACK feedback and:

another PUCCH resource carrying Uplink Control Information (UCI) other than HARQ-ACK feedback, and a scheduled Physical Uplink Shared Channel (PUSCH) resource.

Example 56 includes the subject matter of Example 55, and optionally, wherein the processing circuitry is to: decode a Downlink Control Information (DCI) from the gNodeB including a PUCCH resource indicator (PRI) field; and determine the PUCCH resource based on the PRI and a K1 offset value, wherein the K1 offset value is based on a Physical Downlink Shared Channel (PDSCH) resource to HARQ timing indicator (PDSCH-to-HARQ-timing-indicator) field in the DCI format or on a higher layer parameter downlink data to uplink acknowledgment (dl-DataToUL-ACK) from the gNodeB.

Example 57 includes the subject matter of Example 56, and optionally, wherein the DCI format corresponds to a DCI format scheduling the scheduled PDSCH resource, the processing circuitry to determine the PUCCH resource for HARQ-ACK feedback based on a starting symbol of the PUCCH resource.

Example 58 includes the subject matter of Example 57, and optionally, wherein the DCI format corresponds to a DCI format scheduling the scheduled PDSCH, the processing circuitry to determine the PUCCH resource for HARQ-ACK feedback based on a reference point that corresponds to one of: a beginning of a slot, a beginning of a half-slot, a beginning of a sub-slot, wherein a sub-slot corresponds to a set of consecutive OFDM symbols and is based on a configuration of a timing relationship between different sets of transmission opportunities for the PUCCH with HARQ-ACK feedback.

Example 59 includes the subject matter of Example 56, and optionally, wherein the K1 offset value indicates a time between an end of the scheduled PDSCH and an earliest start of the PUCCH carrying the HARQ-ACK feedback, in units of slots, half-slots, or sub-slots, wherein a sub-slot corresponds to a set of consecutive OFDM symbols and is based on a configuration of a timing relationship between different sets of transmission opportunities for the PUCCH with HARQ-ACK feedback.

Example 60 includes the subject matter of Example 55, and optionally, wherein the processing circuitry is configured to: determine said another PUCCH resource carrying UCI other than HARQ-ACK feedback, and said scheduled PUSCH resource; determine whether at least one of said another PUCCH resource and said scheduled PUSCH resource overlap in time with a determined PUCCH resource to carry HARQ-ACK feedback; and determine, for transmission to the gNodeB, one of: an updated PUCCH resource carrying at least one bit of HARQ-ACK feedback and the UCI other than HARQ-ACK feedback, or an updated PUSCH resource to carry at least one bit of HARQ-ACK feedback multiplexed with Uplink Shared Channel (USCH) and a UCI other than the UCI.

Example 61 includes the subject matter of Example 60, and optionally, wherein: the updated PUCCH resource is to carry a combined UCI including information bits corresponding to respective ones of the HARQ-ACK feedbacks; and the processing circuitry is to: decode a Downlink Control Information (DCI) from the gNodeB including a PUCCH resource indicator (PRI) field; determine the updated PUCCH resource based on the PRI field, the PRI field indicating a PUCCH resource carrying a first or a last dynamic HARQ-ACK feedback of the one or more bits of HARQ-ACK feedback; determine a PUCCH resource set based on a total payload size of the combined UCI; and select a PUCCH resource from the PUCCH resource set using the PRI.

Example 62 includes the subject matter of Example 60, and optionally, wherein, in response to a determination that a plurality of PUCCH resources carrying dynamic or semi-persistent scheduled (SPS) HARQ-ACK feedbacks overlap with the scheduled PUSCH resource, and that the plurality of PUCC resources and the scheduled PUSCH resource are from a same service type or priority, the processing circuitry is to encode information bits corresponding to respective ones of the HARQ-ACK feedbacks onto the updated PUSCH resource.

Example 63 includes the subject matter of Example 62, and optionally, wherein the processing circuitry is to encode and map information bits corresponding to respective ones of the HARQ-ACK feedbacks into the updated PUSCH resource separately, and to allocate an amount of resources for each of the information bits corresponding to respective ones of the HARQ-ACK feedbacks based on a payload size and a beta offset of each of the information bits corresponding to respective ones of the HARQ-ACK feedbacks.

Example 64 includes the subject matter of Example 62, and optionally, wherein the processing circuitry is to concatenate the information bits corresponding to respective ones of the HARQ-ACK feedbacks to multiplex information bits corresponding to respective ones of the HARQ-ACK feedbacks into the updated PUSCH resource.

Example 65 includes the subject matter of any one of Examples 55-63, and optionally, wherein further including a front end module coupled to the RF interface.

Example 66 includes the subject matter of Example 65, and optionally, further including one or more antennas coupled to the front end module to transmit the updated PUCCH resource or updated PUSCH resource.

Example 67 includes a method to be performed at a device of a New Radio (NR) User Equipment (UE) the method including: determining that the UE is configured with a feature of multiple Physical Uplink Control Channel (PUCCH) resources with HARQ-ACK feedback within a slot; determining a Physical Uplink Control Channel (PUCCH) resource to carry Hybrid Automatic Repeat Request Acknowledgment (HARQ-ACK) feedback in response to a scheduled Physical Downlink Shared Channel (PDSCH) resource; and encoding for transmission to a NR evolved NodeB (gNodeB) the PUCCH resource, the PUCCH resource to carry the HARQ-ACK feedback and: another PUCCH resource carrying Uplink Control Information (UCI) other than HARQ-ACK feedback, and a scheduled Physical Uplink Shared Channel (PUSCH) resource.

Example 68 includes the subject matter of Example 67, and optionally, the method further including: decoding a Downlink Control Information (DCI) from the gNodeB including a PUCCH resource indicator (PRI) field; and determining the PUCCH resource based on the PRI and a K1 offset value, wherein the K1 offset value is based on a Physical Downlink Shared Channel (PDSCH) resource to HARQ timing indicator (PDSCH-to-HARQ-timing-indicator) field in the DCI format or on a higher layer parameter downlink data to uplink acknowledgment (dl-DataToUL-ACK) from the gNodeB.

Example 69 includes the subject matter of Example 68, and optionally, wherein the DCI format corresponds to a DCI format scheduling the scheduled PDSCH resource, the method including determining the PUCCH resource for HARQ-ACK feedback based on a starting symbol of the PUCCH resource.

Example 70 includes the subject matter of Example 69 wand optionally, herein the DCI format corresponds to a DCI format scheduling the scheduled PDSCH, the method including determining the PUCCH resource for HARQ-ACK feedback based on a reference point that corresponds to one of: a beginning of a slot, a beginning of a half-slot, a beginning of a sub-slot, wherein a sub-slot corresponds to a set of consecutive OFDM symbols and is based on a configuration of a timing relationship between different sets of transmission opportunities for the PUCCH with HARQ-ACK feedback.

Example 71 includes the subject matter of Example 68, and optionally, wherein the K1 offset value indicates a time between an end of the scheduled PDSCH and an earliest start of the PUCCH carrying the HARQ-ACK feedback, in units of slots, half-slots, or sub-slots, wherein a sub-slot corresponds to a set of consecutive OFDM symbols and is based on a configuration of a timing relationship between different sets of transmission opportunities for the PUCCH with HARQ-ACK feedback.

Example 72 includes the subject matter of Example 67, and optionally, the method further including: determining said another PUCCH resource carrying UCI other than HARQ-ACK feedback, and said scheduled PUSCH resource; determining whether at least one of said another PUCCH resource and said scheduled PUSCH resource overlap in time with a determined PUCCH resource to carry HARQ-ACK feedback; and determining, for transmission to the gNodeB, one of: an updated PUCCH resource carrying at least one bit of HARQ-ACK feedback and the UCI other than HARQ-ACK feedback, or an updated PUSCH resource to carry at least one bit of HARQ-ACK feedback multiplexed with Uplink Shared Channel (USCH) and a UCI other than the UCI.

Example 73 includes the subject matter of Example 72, and optionally, wherein: the updated PUCCH resource is to carry a combined UCI including information bits corresponding to respective ones of the HARQ-ACK feedbacks; and the method further includes: decoding a Downlink Control Information (DCI) from the gNodeB including a PUCCH resource indicator (PRI) field; determining the updated PUCCH resource based on the PRI field, the PRI field indicating a PUCCH resource carrying a first or a last dynamic HARQ-ACK feedback of the one or more bits of HARQ-ACK feedback; determining a PUCCH resource set based on a total payload size of the combined UCI; and selecting a PUCCH resource from the PUCCH resource set using the PRI.

Example 74 includes the subject matter of Example 72, and optionally, wherein the method further includes, in response to a determination that a plurality of PUCCH resources carrying dynamic or semi-persistent scheduled (SPS) HARQ-ACK feedbacks overlap with the scheduled PUSCH resource, and that the plurality of PUCC resources and the scheduled PUSCH resource are from a same service type or priority, encoding information bits corresponding to respective ones of the HARQ-ACK feedbacks onto the updated PUSCH resource.

Example 75 includes the subject matter of Example 74, and optionally, the method further including encoding and mapping information bits corresponding to respective ones of the HARQ-ACK feedbacks into the updated PUSCH resource separately, and to allocate an amount of resources for each of the information bits corresponding to respective ones of the HARQ-ACK feedbacks based on a payload size and a beta offset of each of the information bits corresponding to respective ones of the HARQ-ACK feedbacks.

Example 76 includes the subject matter of Example 74, and optionally, the method further including concatenating the information bits corresponding to respective ones of the HARQ-ACK feedbacks to multiplex information bits corresponding to respective ones of the HARQ-ACK feedbacks into the updated PUSCH resource.

Example 77 includes a device of a New Radio (NR) User Equipment (UE) the device including: means for determining that the UE is configured with a feature of multiple Physical Uplink Control Channel (PUCCH) resources with HARQ-ACK feedback within a slot; means for determining a Physical Uplink Control Channel (PUCCH) resource to carry Hybrid Automatic Repeat Request Acknowledgment (HARQ-ACK) feedback in response to a scheduled Physical Downlink Shared Channel (PDSCH) resource; and encoding for transmission to a NR evolved NodeB (gNodeB) the PUCCH resource, the PUCCH resource to carry the HARQ-ACK feedback and: another PUCCH resource carrying Uplink Control Information (UCI) other than HARQ-ACK feedback, and a scheduled Physical Uplink Shared Channel (PUSCH) resource.

Example 78 includes the subject matter of Example 77, and optionally, further including: means for decoding a Downlink Control Information (DCI) from the gNodeB including a PUCCH resource indicator (PRI) field; and means for determining the PUCCH resource based on the PRI and a K1 offset value, wherein the K1 offset value is based on a Physical Downlink Shared Channel (PDSCH) resource to HARQ timing indicator (PDSCH-to-HARQ-timing-indicator) field in the DCI format or on a higher layer parameter downlink data to uplink acknowledgment (dl-DataToUL-ACK) from the gNodeB.

Example 79 includes a machine-readable medium including code which, when executed, is to cause a machine to perform the method of any one of the Examples above.

Example 80 includes a machine-readable medium including code which, when executed, is to cause a machine to perform the method of any one of the Examples above.

Example 81 includes a product comprising one or more tangible computer-readable non-transitory storage media comprising computer-executable instructions operable to, when executed by at least one computer processor, enable the at least one processor to perform the method of any one of the Examples above.

Example 82 includes a method to be performed at a device of a New Radio (NR) evolved Node B, the method including performing the functionalities of a baseband processing circuitry associated with a gNodeB as set forth in any of the Examples above.

Example 83 includes a device of a of a New Radio (NR) evolved Node B, the device including a Radio Frequency (RF) interface and a processing circuitry coupled to the RF interface, the processing circuitry to perform the functionalities of a baseband processing circuitry associated with a gNodeB as set forth in any of the Examples above.

Example 84 includes an apparatus comprising means for causing a wireless communication device to perform the method of any one of the above Examples.

Example 85 includes a machine-readable medium including code which, when executed, is to cause a machine to perform the method of any one of the above Examples.

Example 86 includes a product comprising one or more tangible computer-readable non-transitory storage media comprising computer-executable instructions operable to, when executed by at least one computer processor, enable the at least one computer processor to perform the method of any one of the above Examples.

Example 87 includes an apparatus comprising means for causing a wireless communication device to perform the method of any one of the above Examples.

Example 88 may include a signal as described in or related to any of the examples above, or portions or parts thereof.

Example 89 may include a signal in a wireless network as shown and described herein.

Example 90 may include a method of communicating in a wireless network as shown and described herein.

Example 91 may include a system for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed.

What is claimed is:

1. An apparatus of a user equipment (UE), comprising:
   a Radio Frequency (RF) interface, and
   processing circuitry coupled to the RF interface, the processing circuitry configured to:
   determine an overlap in time between a plurality of determined Physical Uplink Control Channel (PUCCH) resources to carry a respective plurality of Hybrid Automatic Repeat Request Acknowledgment (HARQ-ACK) feedbacks and another determined PUCCH resource to carry an Uplink Control Information (UCI);
   determine an updated PUCCH resource for carrying at least a first HARQ-ACK feedback of the plurality of HARQ-ACK feedbacks and the UCI, wherein the updated PUCCH resource does not overlap in time with a determined PUCCH resource to carry a second HARQ-ACK feedback of the plurality of HARQ-ACK feedbacks not included in the updated PUCCH resource; and
   encode the updated PUCCH resource and the determined PUCCH resource for transmission to a base station within one slot.

2. The apparatus of claim 1, wherein the processing circuitry is further configured to:
   decode a Downlink Control Information (DCI) from a base station, the DCI including a PUCCH resource indicator (PRI) field; and
   determine the updated PUCCH resource based on the PUCCH resource indicator field in the DCI.

3. The apparatus of claim 2, wherein the processing circuitry is further configured to
   determine the updated PUCCH resource and the determined PUCCH resource based on a combination of the PRI field and a KI offset indicated to the UE by the base station.

4. The apparatus of claim 3, wherein the processing circuitry is further configured to determine the KI offset by decoding one of a Physical Downlink Shared Channel (PDSCH) resource to HARQ timing indicator (PDSCH-to-HARQ-timing-indicator) field in the DCI or a higher layer parameter downlink data to uplink acknowledgment (dl-DataToUL-ACK) from the base station.

5. The apparatus of claim 4, wherein the PRI indicates a starting PUCCH symbol for each of the updated PUCCH resource and the determined PUCCH resource, and wherein the processing circuitry is further configured to determine, in units of slots, half-slots or a set of one or more symbols, a PDSCH-end to HARQ-ACK-start timing offset using a combination of the starting PUCCH symbol and a value of the PDSCH-to-HARQ-timing-indicator field.

6. The apparatus of claim 2, wherein the DCI is a first or last DCI scheduling a Physical Downlink Shared Channel (PDSCH) for which the plurality of HARQ-ACK feedbacks are to be scheduled, and wherein the plurality of HARQ-ACK feedbacks in the updated PUCCH resource are to be scheduled in a slot.

7. The apparatus of claim 1, wherein a bit order in a same slot of said at least one of the plurality of HARQ-ACK feedbacks is to follow a timing of the said at least one of the plurality of HARQ-ACK feedbacks.

8. The apparatus of claim 1, wherein an ordering of a mapping of information for said at least one of the plurality of HARQ-ACK feedbacks is based on an order of HARQ process identifications (PIDs) used to schedule corresponding Physical Downlink Shared Channel (PDSCH) resources.

9. The apparatus of claim 1, wherein the at least one of the plurality of HARQ-ACK feedbacks includes transport block (TB) based HARQ-ACK feedbacks and code block group (CBG) based HARQ-ACK feedbacks, the updated PUCCH resource to carry two separate HARQ-ACK codebooks corresponding to the TB based HARQ-ACK feedbacks and to the CBG based HARQ-ACK feedbacks respectively.

10. The apparatus of claim 1, wherein the UCI does not include HARQ-ACK feedback responsive to a received physical downlink shared channel transmission scheduled by a physical downlink control channel.

11. A method to be performed at a device of a New Radio (NR) User Equipment (UE), the method including:
    determining an overlap in time between a plurality of determined Physical Uplink Control Channel (PUCCH) resources to carry a respective plurality of Hybrid Automatic Repeat Request Acknowledgment (HARQ-ACK) feedbacks and another determined PUCCH resource to carry an Uplink Control Information (UCI);
    determining an updated PUCCH resource for carrying at least a first HARQ-ACK feedback of the plurality of HARQ-ACK feedbacks and the UCI, wherein the updated PUCCH resource does not overlap in time with a determined PUCCH resource to carry a second HARQ-ACK feedback of the plurality of HARQ-ACK feedbacks not included in the updated PUCCH resource; and
    encoding the updated PUCCH resource and the determined PUCCH resource for transmission to a base station within one slot.

12. The method of claim 11, wherein a bit order in a same slot of said at least one of the plurality of HARQ-ACK feedbacks is to follow a timing of the said at least one of the plurality of HARQ-ACK feedbacks.

13. The method of claim 11, comprising:
    decoding a Downlink Control Information (DCI) from a base station, the DCI including a PUCCH resource indicator (PRI) field; and
    determining the updated PUCCH resource based on the PUCCH resource indicator field in the DCI.

14. The method of claim 13, comprising determining the updated PUCCH resource and the determined PUCCH resource based on a combination of the PRI field and a KI offset indicated to the UE by the base station.

15. The method of claim 14, comprising determining the KI offset by decoding one of a Physical Downlink Shared Channel (PDSCH) resource to HARQ timing indicator (PDSCH-to-HARQ-timing-indicator) field in the DCI or a higher layer parameter downlink data to uplink acknowledgment (dl-DataToUL-ACK) from the base station.

16. The method of claim 15, wherein the UCI does not include HARQ-ACK feedback responsive to a received physical downlink shared channel transmission scheduled by a physical downlink control channel.

17. The method of claim 11, wherein the UCI does not include HARQ-ACK feedback responsive to a received physical downlink shared channel transmission scheduled by a physical downlink control channel.

18. An apparatus of a base station, the apparatus including:
  a Radio Frequency (RF) interface, and
  processing circuitry coupled to the RF interface, the processing circuitry to:
    encode a Downlink Control Information (DCI) for transmission to a NR User Equipment (UE), the DCI including a PUCCH resource indicator (PRI) field to allow a UE to determine an updated Physical Uplink Control Channel (PUCCH) resource from the PRI, wherein the updated PUCCH resource is to carry at least a first HARQ-ACK feedback of a plurality of HARQ-ACK feedbacks and an Uplink Control Information (UCI), wherein the updated PUCCH resource does not overlap in time with a determined PUCCH resource to carry a second HARQ-ACK feedback of the plurality of HARQ-ACK feedbacks not included in the updated PUCCH resource and wherein the updated PUCCH resource and the determined PUCCH are within one slot; and
    decode an updated PUCCH from the UE.

19. The apparatus of claim 18, wherein:
  the processing circuitry is to encode for transmission to the UE a K1 offset, a combination of the PRI field and a K1 offset to allow the UE to determine the updated PUCCH resource and the determined PUCCH resource.

20. The apparatus of claim 19, wherein the processing circuitry is to encode the K1 offset in a Physical Downlink Shared Channel (PDSCH) resource to HARQ timing indicator field of the DCI.

* * * * *